United States Patent [19]
Taguchi et al.

[11] Patent Number: 5,957,486
[45] Date of Patent: Sep. 28, 1999

[54] AIR BAG DEVICE AND METHOD FOR FOLDING AN AIR BAG

[75] Inventors: Masahiro Taguchi, Hazu-gun; Shoichi Yamanaka, Anjo; Tomoji Suzuki; Masayasu Kato, both of Nagoya; Tetsuya Takafuji, Kariya; Shinichiro Kuroyanagi, Toyohashi, all of Japan

[73] Assignee: Denso Corporation, Kariya, Japan

[21] Appl. No.: 08/905,118

[22] Filed: Aug. 1, 1997

[30] Foreign Application Priority Data

| Aug. 2, 1996 | [JP] | Japan | 8-220404 |
| Aug. 30, 1996 | [JP] | Japan | 8-231121 |
| Mar. 13, 1997 | [JP] | Japan | 9-059068 |

[51] Int. Cl.$^6$ .................................................. B60R 21/24
[52] U.S. Cl. ........................................ 280/729; 280/743.1
[58] Field of Search ........................... 280/729, 732, 280/743.1

[56] References Cited

U.S. PATENT DOCUMENTS

| 5,282,646 | 2/1994 | Melvin et al. | 280/729 |
| 5,316,337 | 5/1994 | Yamaji et al. | 280/743.1 |
| 5,636,861 | 6/1997 | Orsulak et al. | 280/729 |

FOREIGN PATENT DOCUMENTS

| 58-23756 | 2/1983 | Japan. |
| 2 265 118 | 9/1993 | United Kingdom. |

*Primary Examiner*—Kenneth R. Rice
*Attorney, Agent, or Firm*—Pillsbury Madison & Sutro LLP

[57] ABSTRACT

Gas generated from an inflator flows into a first portion of a main bag and each part of an inner bag, and the first portion is inflated toward an area in front of passenger's seat. Then, the gas filling the first portion which has been inflated flows into a second portion of the main bag. In this situation, the inflation direction of the second portion is more downward than the inflation direction of the first portion. As a result, a speed of backward inflation is decreased.

21 Claims, 25 Drawing Sheets

FIG. 11A
FIG. 11B
FIG. 11C
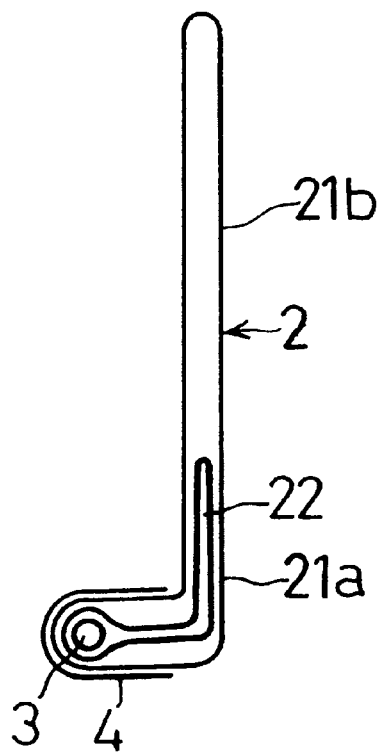
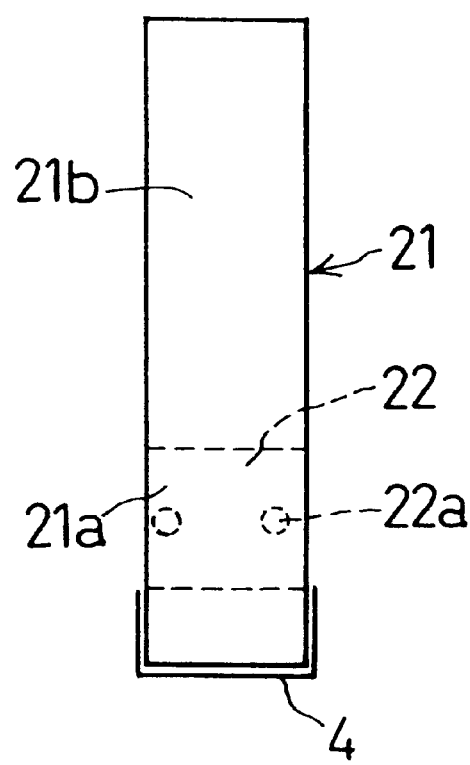
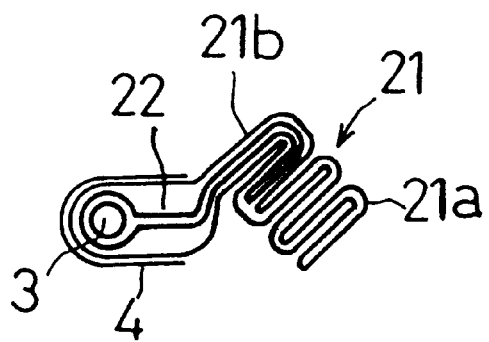

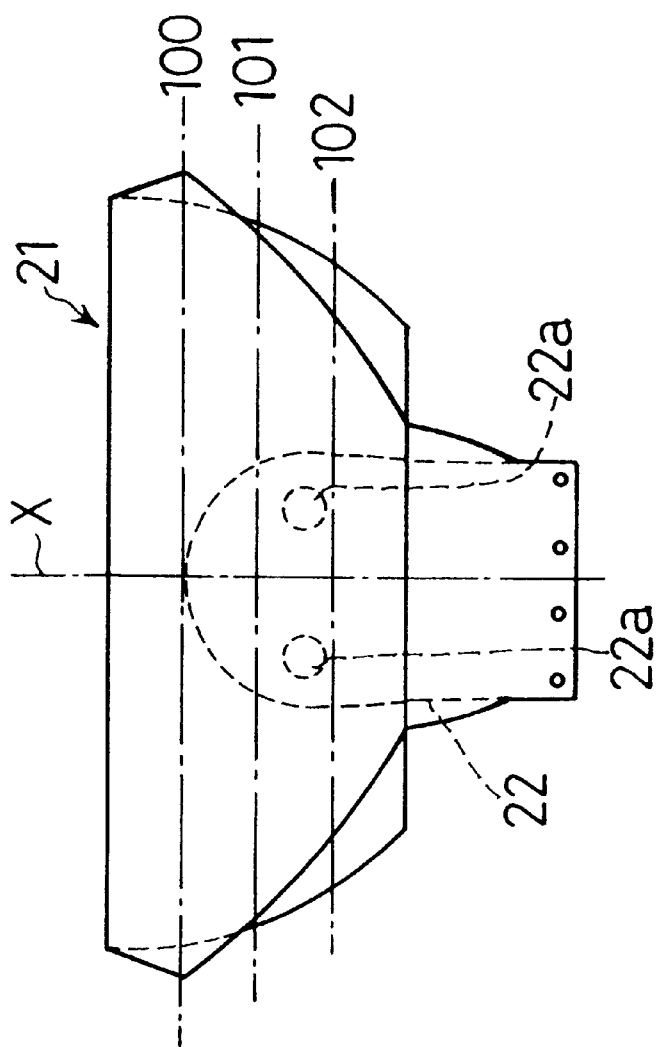
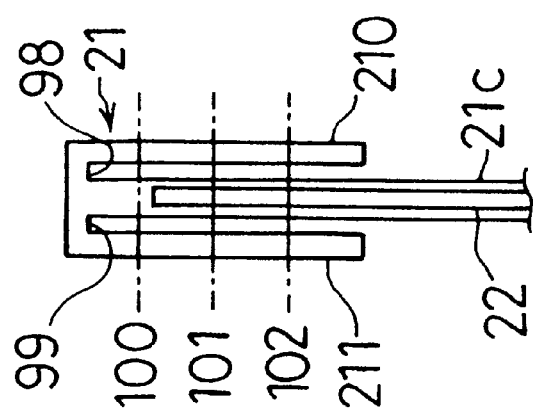

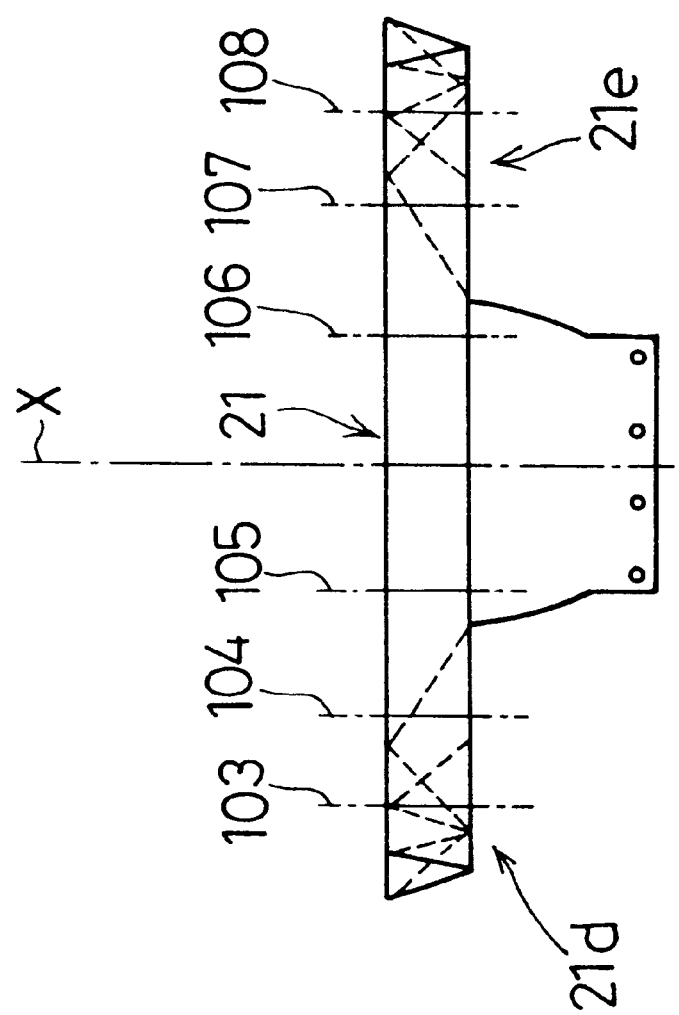
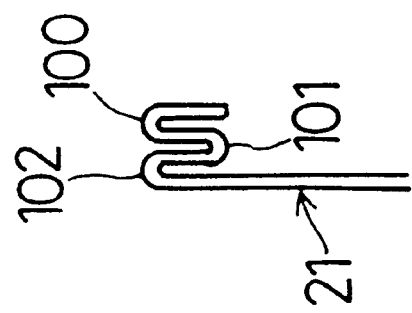

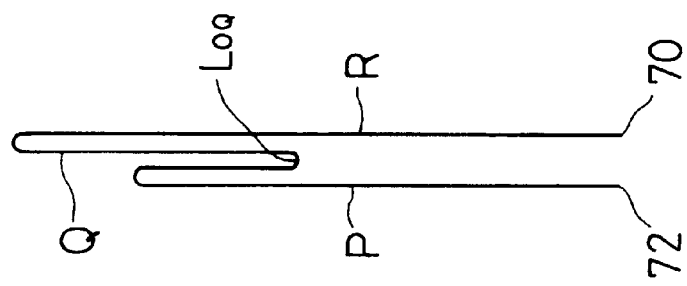
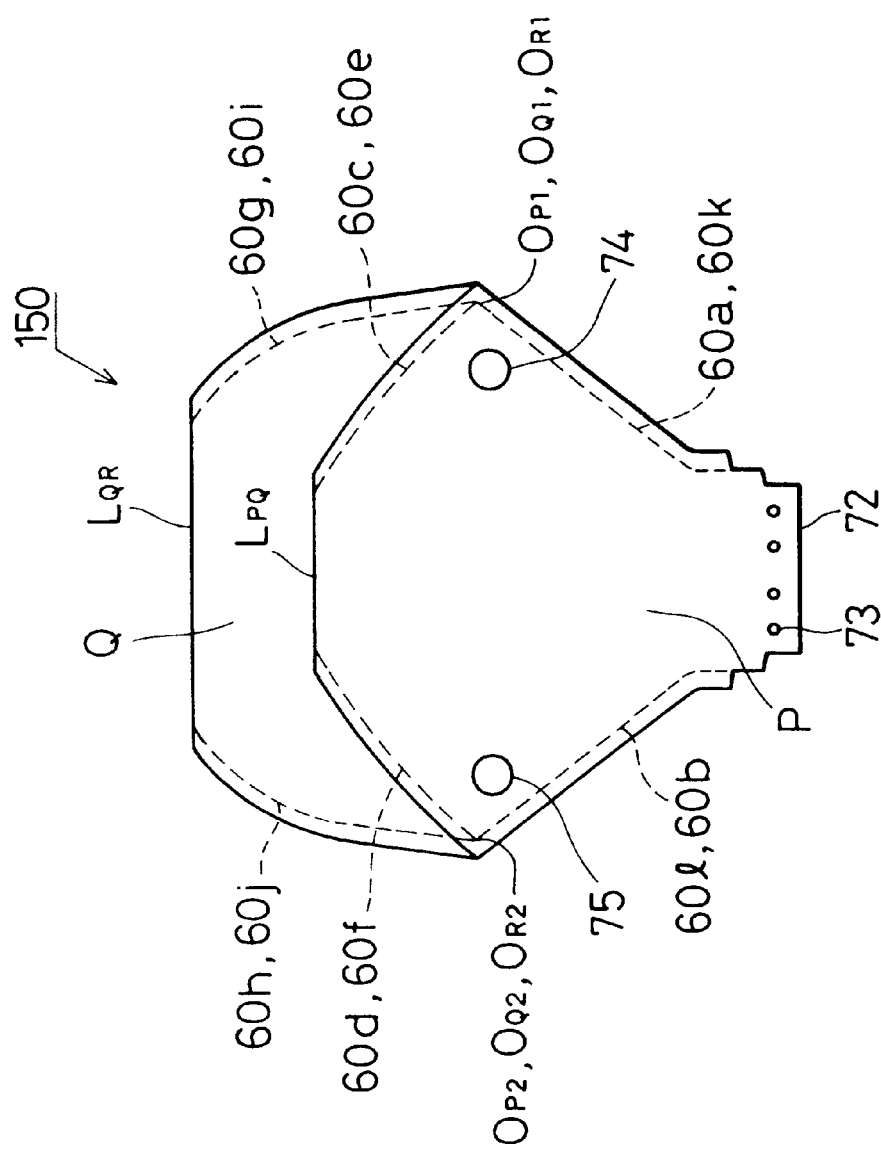

AIR BAG DEVICE AND METHOD FOR FOLDING AN AIR BAG

CROSS REFERENCE TO RELATED APPLICATIONS

This application is based on and claims priority of Japanese Patent Application Nos. Hei. 8-220404 filed on Aug. 2, 1996, Hei. 8-231121 filed on Aug. 30, 1996, and Hei. 9-59068 filed on Mar. 13, 1997, the contents of which are incorporated herein by reference.

BACKGROUND OF THE INVENTION

1. Field of the Invention

The present invention relates to an air bag device for vehicles and, more particularly, to an air bag device which inflates an air bag installed in a vehicle upon collision of the vehicle to protect a passenger.

2. Description of Related Art

One air bag device, proposed by JP-U-58-23756, inflates an air bag installed in a vehicle upon collision of the vehicle to protect a passenger. The air bag in the air bag device is inflated toward the passenger along the inside of a windshield from an upper side of an instrumental panel. However, as concerns this type of air bag device, the air bag is rapidly inflated the toward the passenger by means of kinetic energy produced by gas which rapidly flows into the air bag from an inflator (gas producing means). In order to solve this problem, a dual bag type air bag device is proposed by JP-A-5-262195. This air bag device includes a container, including an inflator, fixed in front of a passenger seat, a main bag folded in the container, and an inner bag including holes therein for allowing to flow gas therefrom and folded in the container. In this air bag device, when the gas produced by the inflator upon collision of the vehicle flows into the inner bag, the inner bag is inflated. After that, the gas flows up and down in the main bag through the holes formed in the inner bag, and the main bag is inflated toward an area in front of the passenger seat.

The dual bag type air bag device can decrease inflation speed of the main bag compared to a single type air bag device which does not include the inner bag because in the dual bag type air bag device the gas dispersively flows into the main bag through the holes formed on the inner bag. Though the inflation speed is decreased by holes formed on the inner bag, it is not sufficiently decreased because the inflation speed depends on gas pressure in the inner bag, thus, the passenger may receive an impact from the air bag.

Further, according to the air bag device proposed by JP-A 5-262195, when the upper half of the passenger's body is suddenly inclined forward upon collision of the vehicle, the edge of the main bag is inflated earlier than the upper part of the main bag, and then, the main bag is inflated upward. Thus, the passenger' head inclines forward after the edge of the main bag contact with the passenger's body, and the passenger's head is thrusted up, as a result, the passenger may receive an impact from the air bag.

SUMMARY OF THE INVENTION

In view of the above problems of the related art, a primary object of the present invention is to provide an air bag device which can decrease the impact of inflation to passengers upon the inflation of the air bag.

In order to accomplish the above-described objects in the present invention, an air bag includes a contact face to free a passenger, and the contact face includes an upper portion and an lower portion. The upper portion of the contact face is inflated earlier than the lower portion of the contact face. Therefore, the passenger's head is not thrusted up, and as a result, the passenger does not receive an impact from the air bag.

Further, in the present invention, a gas generator is disposed in the air bag device and the air bag includes an upper folding portion corresponding to an upper portion of the contact portion when the air bag is inflated and a lower folding portion corresponding to a lower portion of the contact portion when the air bag is inflated. The gas generator provides gas the upper folding portion in preference to the lower folding portion.

Preferably, the total of angles at top points of the plural polygon shaped sections which are formed at both longitudinal sides of the belt portion, and point away from the belt portion is less than 360 degrees.

BRIEF DESCRIPTION OF THE DRAWINGS

Additional objects and advantages of the present invention will be more readily apparent from the following detailed description of preferred embodiments thereof when taken together with the accompanying drawings, in which:

FIG. 11A is a cross-sectional view illustrating the air bag illustrated in FIG. 10 in a first folded state;

FIG. 11B is a plane view illustrating the air bag illustrated in FIG. 10 in the first folded state;

FIG. 11C is a cross-sectional view illustrating the air bag illustrated in FIG. 10 in a second folded state;

FIG. 14A is a cross-sectional view illustrating the air bag illustrated in FIG. 12 in a first folded state;

FIG. 14B is a plane view illustrating the air bag illustrated in FIG. 12 in the first folded state;

FIG. 15A is a cross-sectional view illustrating the air bag illustrated in FIG. 12 in a second folded state;

FIG. 15B is a plane view illustrating the air bag illustrated in FIG. 12 in the second folded state;

FIG. 29A is a plane view illustrating the air bag illustrated in FIG. 28 in a folded state;

FIG. 29B is a cross-sectional view illustrating the air bag illustrated in FIG. 28 in the folded state;

DETAILED DESCRIPTION OF THE PREFERRED EMBODIMENTS

Preferred embodiments of the present invention are described hereinafter with reference to the accompanying drawings.

(First Embodiment)

Figure 1:
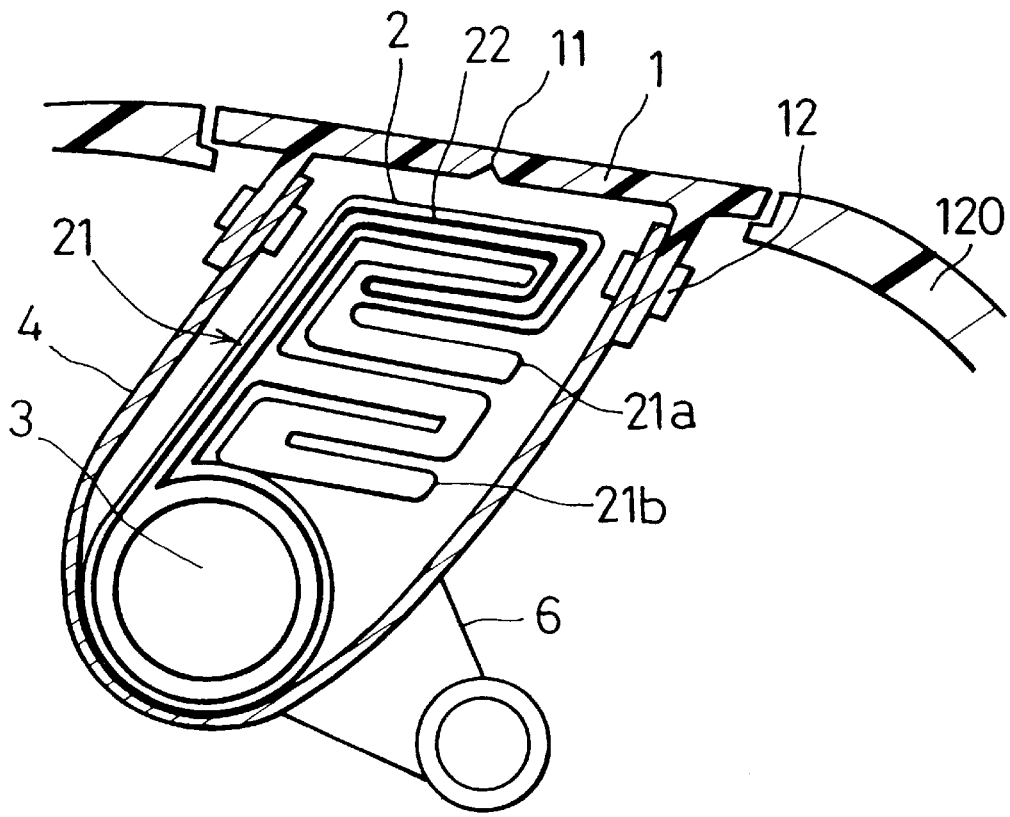
FIG. 1 is a cross-sectional view illustrating an air bag device for vehicles according to a first preferred embodiment of the present invention.
Figure 2A:
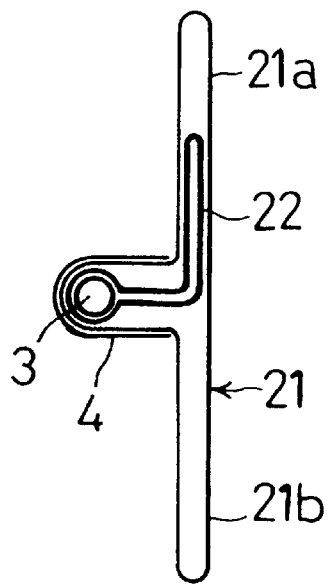
FIG. 2A is a cross-sectional view illustrating an air bag illustrated in FIG. 1 in a spread out state.
Figure 2B:
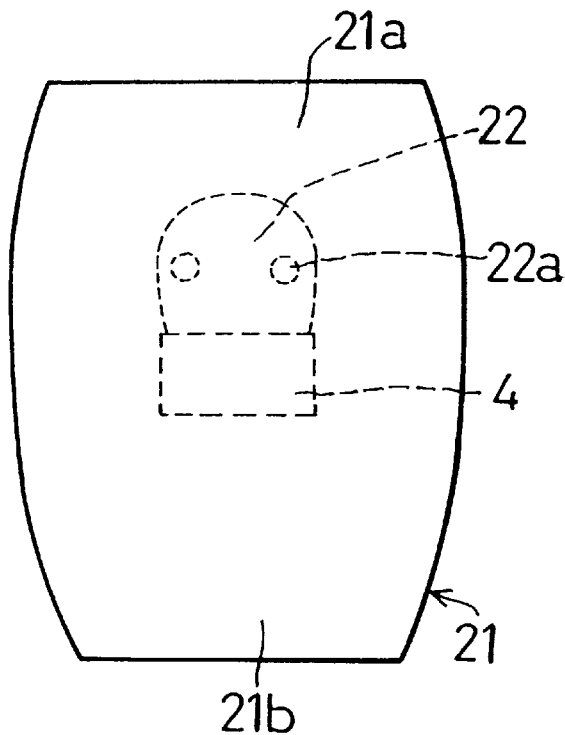
FIG. 2B is a plane view illustrating the air bag illustrated in FIG. 1 in the spread out state.
Figure 2C:
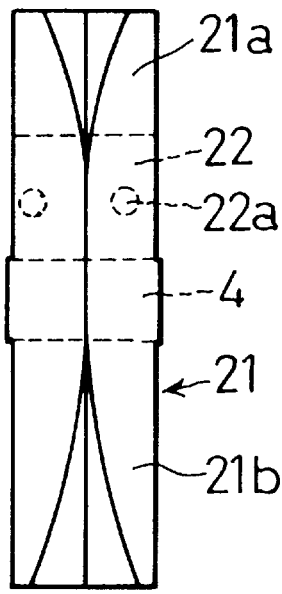
FIG. 2C is a cross-sectional view illustrating the air bag illustrated in FIG. 1 in a first folded state.

FIG. 1 shows a cross-sectional view illustrating an uninflated air bag device according to this embodiment. FIGS. 2A–2C shows a process of folding a main air bag.

The air bag includes a lid 1, an air bag 2 which is folded, an inflator 3 and a case 4. The air bag 2 includes the main bag 21 and an inner bag 22 which is disposed in the main bag 21. There are a plurality of holes 22a for allowing gas to flow therefrom on the inner bag 22. The inflator 3 is a cylindrical can which filled with high pressure gas, and is disposed in the bottom of the case 4 and is covered by the main bag 21 and the inner bag 22. The bottom of the inflator 3 is fixed to side walls of the case 4 by nuts and bolts (not shown). There are also plurality of holes for allowing gas to flow thereinto at one end portion of the main bag 21. The case 4 is a metal can which is fixed to an instrumental panel 120. The air bag 2 which is folded is disposed in the case 4. The case 4 has a opening portion at an upper edge thereof, and the opening portion is usually covered by the lid 1. The lid 1 is made of resin, and is fixed to the case 4 by rivets 12. An upper side of the lid 1 is fitted in the instrumental panel 120, and is used as a part of the instrumental panel 120. A lip line 11 that is a groove is formed inside the upper side of the lid 1.

Further, the air bag device includes a first portion 21a and a second portion 21b, each of which is a part of the main bag 21 and separately folded. The first portion 21a extends from a bottom portion of the main bag 21 toward the lid 1, and is folded near the lid 1. The second portion 21b forks between the bottom portion of the main bag 21 and the first portion 21a of the main bag 21, and is folded in between the first portion 21a and the inflator 3. Both the first portion 21a and the second portion 21b can be folded up, for instance, in a zigzag shape or a loop shape.

Figure 2D:
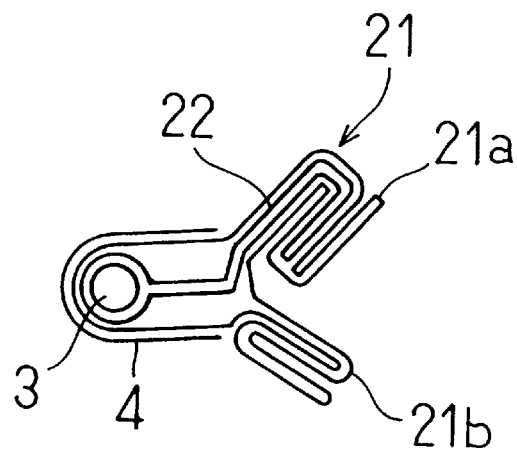
FIG. 2D is a cross-sectional view illustrating the air bag illustrated in FIG. 1 in a second folded state.

A method of folding the main bag 21 is described based on FIGS. 2A–2D. First, as shown in FIGS. 2A and 2B, the first portion 21a and the second portion 21b are spread out (an upper half side of the main bag 21 is the first portion 21a and a lower half side of the main bag 21 is the second portion 21b), and the inner bag 22 is folded toward the first portion 21a and is held in the main bag 21. Next, as shown in FIG. 2C, the right side and the left side of the first portion 21a and those of the second portion 21b are folded toward the side of the main bag 21 opposite the case 4; then, they are folded toward the center of the main bag 21 so that the total width of the first portion 21 and the second portion 22 is the approximately the same as the width of the case 4. Next, as shown in FIG. 2D, the first portion 21a and the second portion 21b are folded up in a zigzag shape, and contained in the case 4.

Figure 3A:
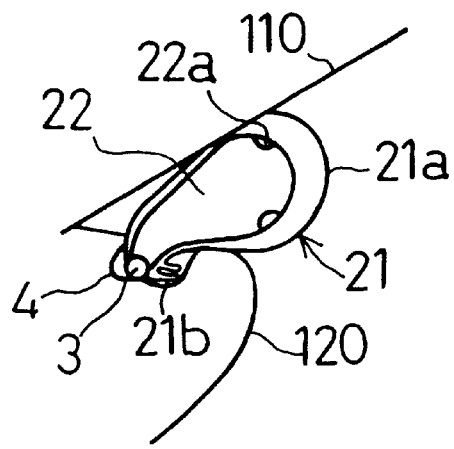
FIG. 3A is a schematic view illustrating a first inflation step about a main bag 21 and an inner bag 22.
Figure 3B:
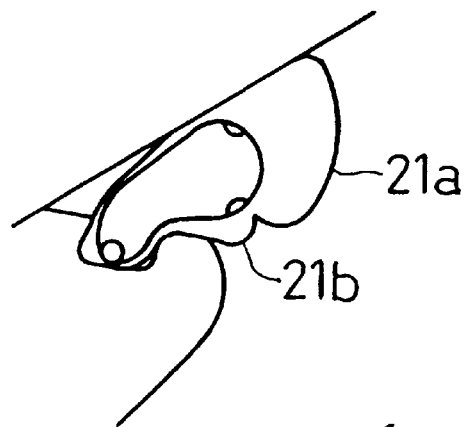
FIG. 3B is a schematic view illustrating a second inflation step about the main bag 21 and the inner bag 22.
Figure 3C:
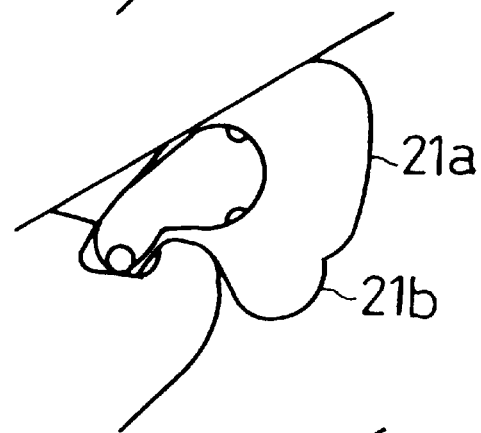
FIG. 3C is a schematic view illustrating a third inflation step about the main bag 21 and the inner bag 22.
Figure 3D:
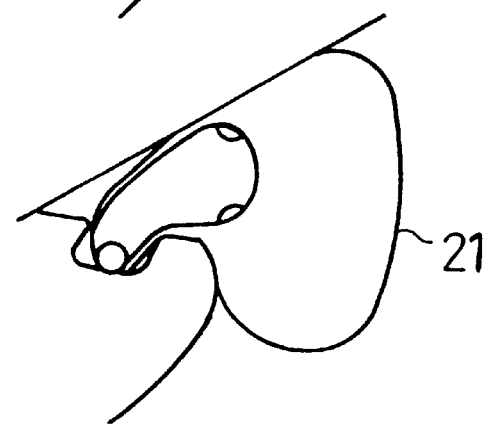
FIG. 3D is a schematic view illustrating a fourth inflation step about the main bag 21 and the inner bag 22.

The operation of the air bag device according to this embodiment is described based on FIGS. 3A–3D. The gas generated from the inflator 3 upon collision of the vehicle flows into each part of the inner bag 22, and because of this, the inner bag 22 and the first portion 21a of the main bag 21 are expanded. Next, the lip line 11 of the lid 1 is ruptured by gas pressure from the air bag 2, and the inner bag 22 and the first portion 21a of the main bag 21 are inflated from case 4 toward an area in front of the passenger's seat, especially an area near the case 4 (FIG. 3A). Then, the gas filling the first portion 21a flows into the second portion 21b of the main bag 21 by means of increasing gas pressure in the first portion 21a of the main bag 21 which is inflated; then, the second portion 21b begin to inflate (FIG. 3B). In this situation, because the second portion 21b is inflated by gas flowing from the first portion 21a which has been inflated out of the case 4, the flowing direction of the gas which flows into the second portion 21b from the first portion 21a is different from the inflation direction of the first portion 21a (the direction away from the case 4), that is, the inflation direction of the second portion 21b is more downward than the inflation direction of the first portion 21a (FIGS. 3C and 3D). As a result, the main bag 21 is not simply inflated toward the back of the vehicle or upward toward the back of the vehicle, and a speed of the backward inflation and a volume of the backward inflation (a speed of inflation toward the passenger and a volume of the inflation toward the passenger), especially toward the passenger's face, are decreased. Therefore, because the main bag 21 is inflated in the predetermined back direction, the main bag 21 can softly contact with an adult passenger sitting on the seat or a child passenger standing between the instrumental panel and passenger's seat.

Figure 4:
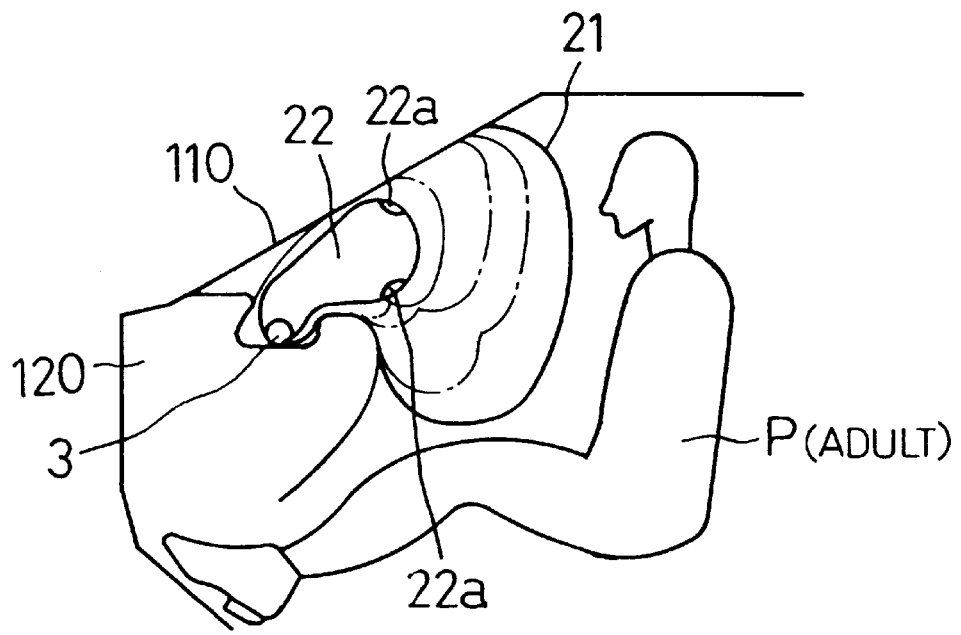
FIG. 4 is a schematic view illustrating an inflated air bag illustrated in FIG. 1 when an adult sits on passenger's seat.
Figure 5:
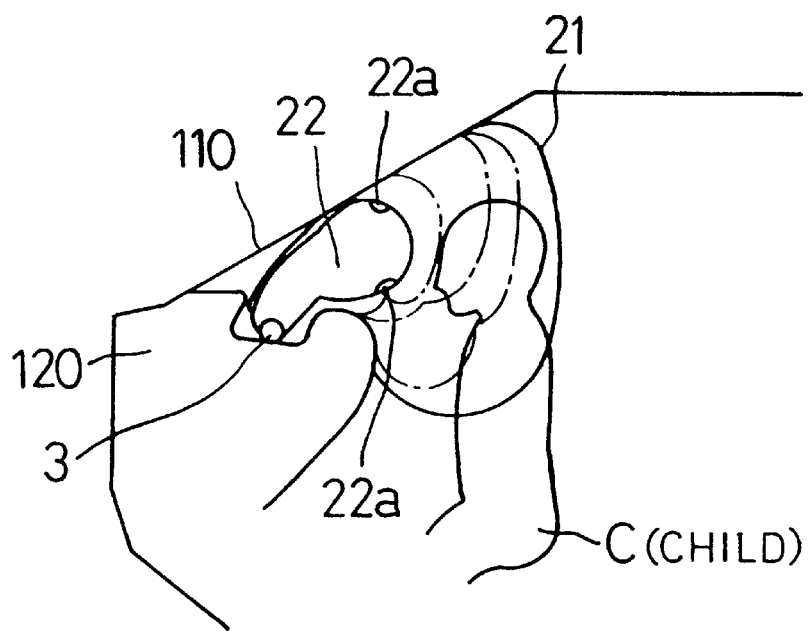
FIG. 5 is a schematic view illustrating an inflated air bag illustrated in FIG. 1 when an child stands between an instrumental panel and passenger's seat.

In this embodiment, though the backward inflation of the main bag 21 is decreased when portion 21b begins to inflate, the inflation of the main bag 21 is not prevented as described above; thus, the inflation of the main bag 22 is not prevented and the main bag 21 can be smoothly inflated. Therefore, because the main bag 21 can be prevented from being straight and backward inflated, it can not only softly contact with the passenger sitting on the seat (FIG. 4) but also softly contact with the child standing between the instrumental panel and passenger's seat (FIG. 5). In FIGS. 3–5, reference numeral 110 indicates a windshield.

Figure 6:
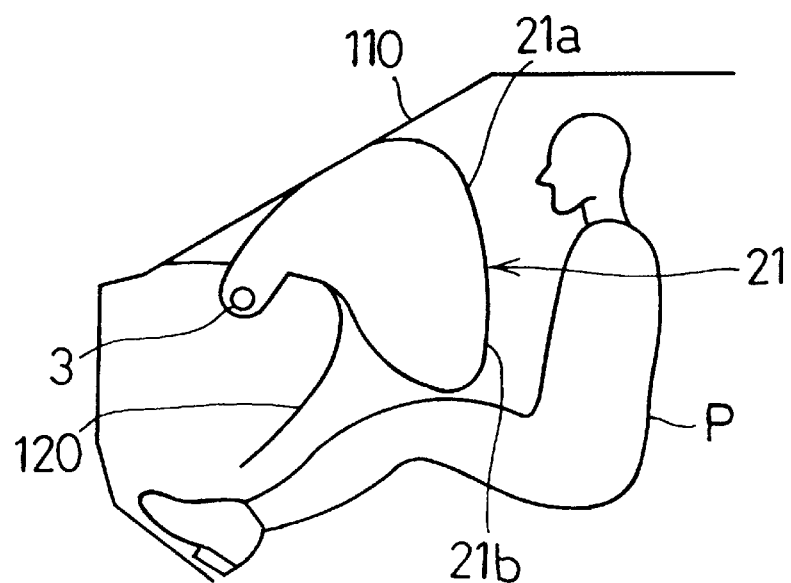
FIG. 6 is a schematic view illustrating an another inflated air bag which the volume of the main bag is different from the air bag illustrated in FIG. 4.

As shown in FIG. 6, if the volume of the first portion 21a is smaller than that of the main bag illustrated in FIGS. 3A–3D and the volume of the second portion 21b is larger than that of the main bag illustrated in FIGS. 3A–3D, it is possible to not only keep the soft contact with the passenger's face but also to absorb a shock upon the collision of the vehicle to the upper half of the body of the passenger.

(Second Embodiment)

Figure 7:
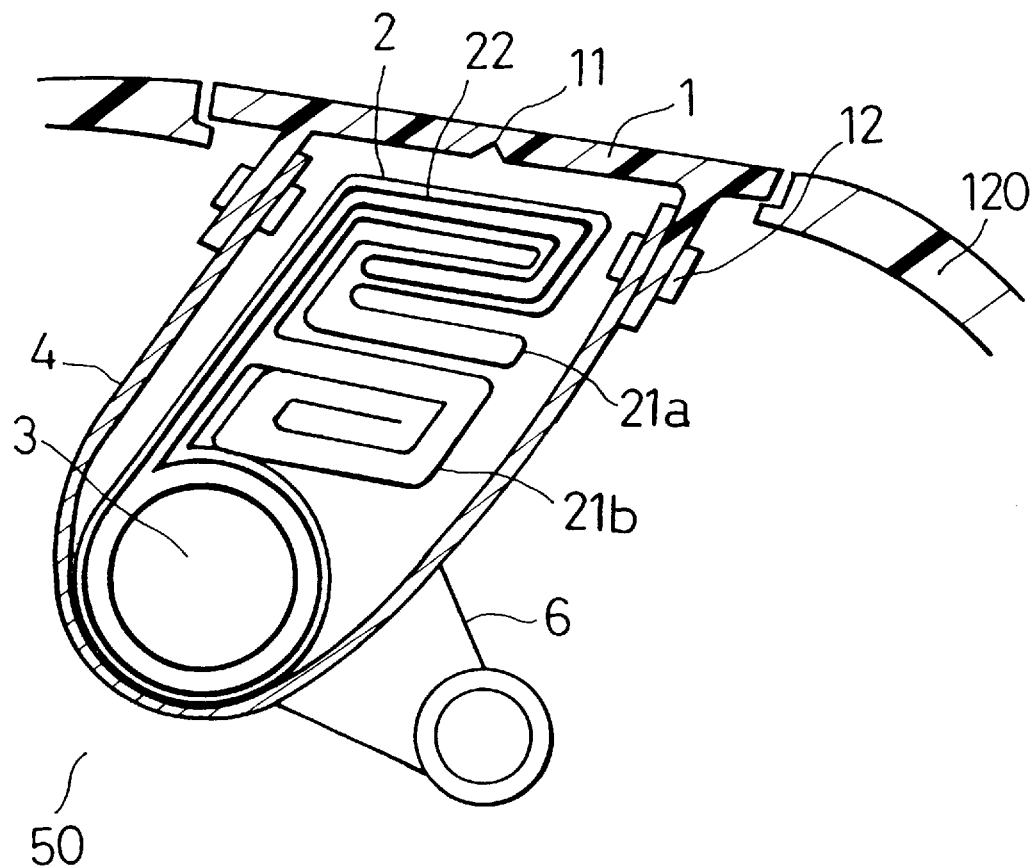
FIG. 7 is a cross-sectional view illustrating an air bag device for vehicles according to a second preferred embodiment of the present invention.

A second preferred embodiment of the present invention is described based on FIG. 7. Parts in this embodiment which are the same as parts in the first embodiment are denoted by the same reference numerals. This embodiment differs from the first preferred embodiment in that the second portion 21b of the main bag 21 is folded up in a loop shape. According to the this structure, the gas can flow into the second portion 21b from the first portion 21a which has been fully inflated, and it is possible to inflate the second portion 21b in a more downward direction.

(Third Embodiment)

Figure 8:
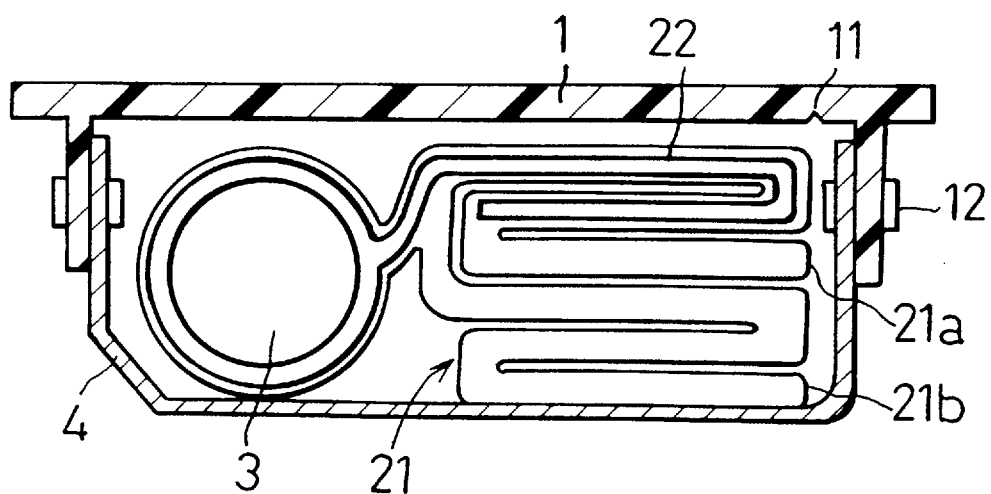
FIG. 8 is a cross-sectional view illustrating an air bag device for vehicles according to a third preferred embodiment of the present invention.
Figure 9:
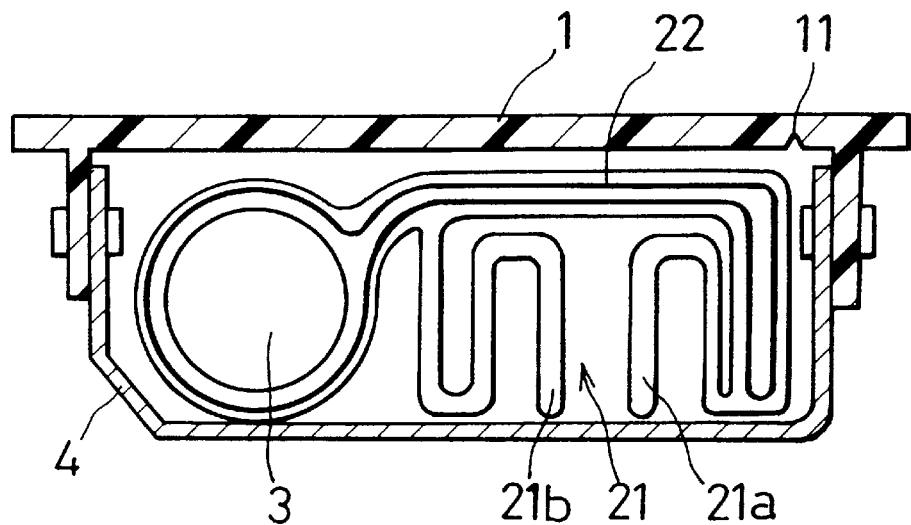
FIG. 9 is a cross-sectional view illustrating an air bag device in which the location of the main bag is different from the air bag illustrated in FIG. 8.

A third preferred embodiment of the present invention is described based on FIG. 8. In this embodiment, the lip line 11 is disposed toward the rear side of the lid 1, the inflator 3 is disposed forward side of the case 4, the first portion 21a is disposed in the upper rear portion of the case 4 and the second portion 21b is disposed in the lower rear portion of the case 4. According to the this structure, when the first portion 21a is inflated a short distance backward or upward toward the back of the vehicle from the case 4 after the gas pressure ruptures the lip line 11, the first portion 21a pushes the second portion 21b toward the bottom of the case 4. This is because the inflation of the second portion 21b is delayed, and the second portion 21b is inflated downward or toward the back of the vehicle from a predetermined portion of the first portion 21a (under the first portion 21a) which has been inflated after the first portion 21a is fully inflated. Therefore, the main bag 21 can be prevented from being straight and inflated backward. With regard to the first portion 21a and the second portion 22b in this embodiment, they can be also folded up in the zigzag shape or the in loop shape. Also, as illustrated in FIG. 9, it is possible to arrange the first portion 21a and the second portion 22b in parallel instead of arranging them up and down as illustrated in FIG. 8.

(Fourth Embodiment)

Figure 10:
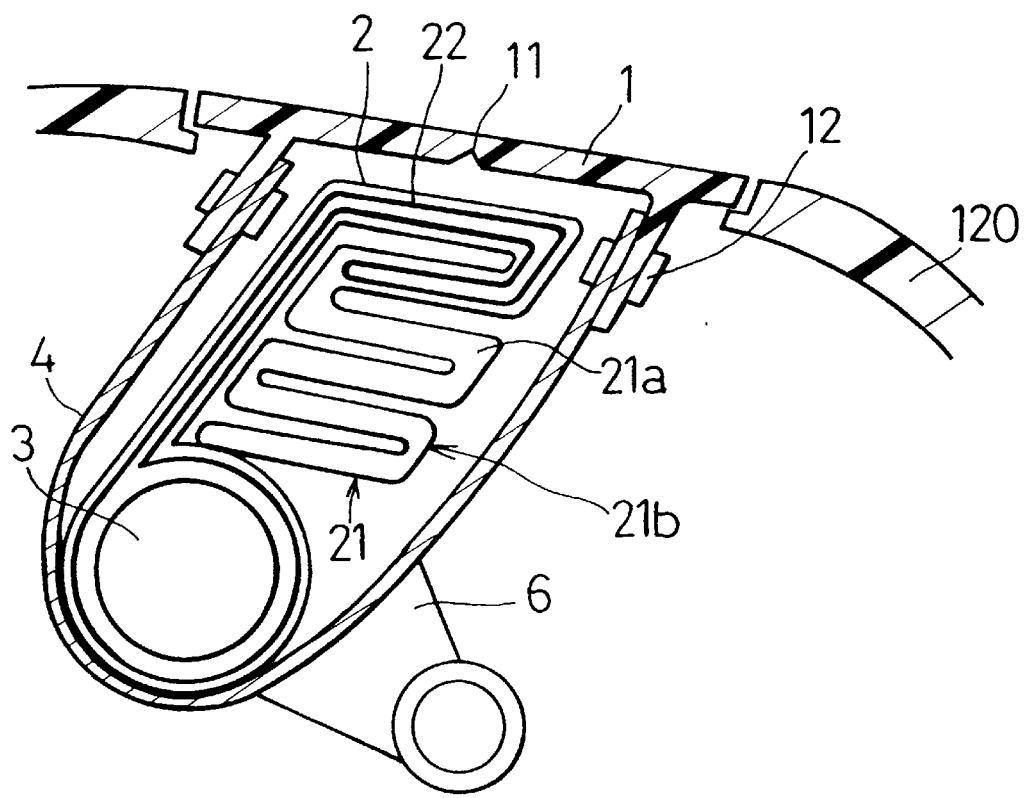
FIG. 10 is a cross-sectional view illustrating an air bag device for vehicles according to a fourth preferred embodiment of the present invention.

A fourth preferred embodiment of the present invention is described based on FIGS. 10–11C. In this embodiment, the second portion 21b extends from an edge of the folded first portion 21a, and is disposed under the first portion 21a in the case 4; that is, the second portion 21b is far from the lid 1 of the case 4. According to this embodiment, when the first portion 21a is inflated a short distance backward or upward toward the back of the vehicle from the case 4 after the gas pressure ruptures the lip line 11, the gas flows into the second portion 21b from the first portion 21a which has been inflated. Therefore, the inflation direction of the second portion 21b depends on a posture of a bottom portion of the second portion 21b, and the second portion 21b is inflated under the first portion 21a without being inflated backward. Further, because the inflation of the second portion 21b is delayed, the main bag 21 can be prevented from being suddenly inflated backward and the air bag 21 can make contact with the passenger softly upon the collision of the vehicle.

A method of folding the main bag 21 is described based on FIGS. 11A–11C. First, as shown in FIGS. 11A and 11B, the first portion 21a and the second portion 21b are spread out, and as shown in FIG. 11C, the main bag 21 is folded up in a zigzag shape, and contained in the case 4. With regard to the first portion 21a and the second portion 22b in this embodiment, they can be also folded up in the zigzag shape or in the loop shape.

(Fifth Embodiment)

Figure 12:
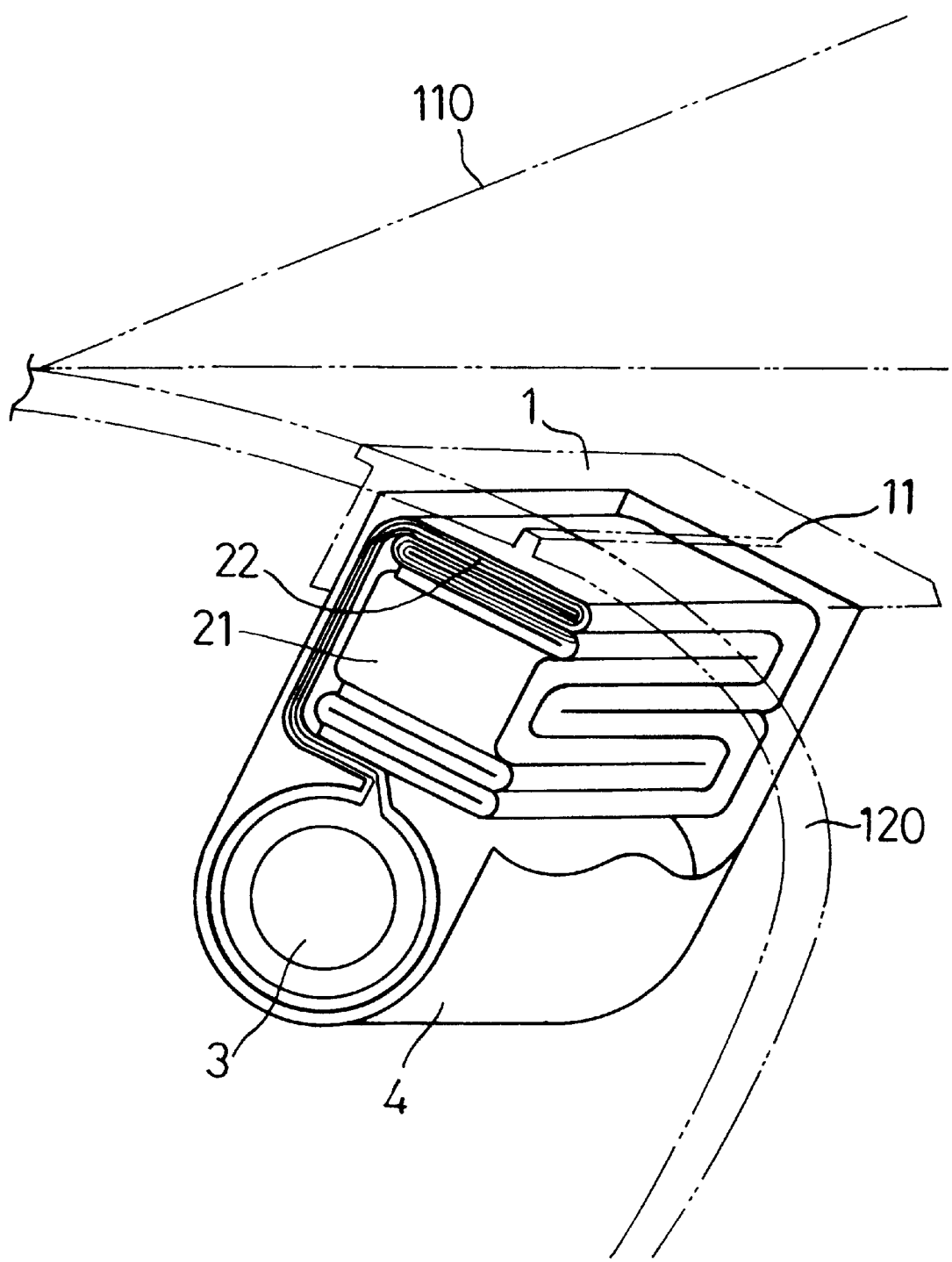
FIG. 12 is a perspective view illustrating an air bag device for vehicles according to a fifth preferred embodiment of the present invention.
Figure 13B:
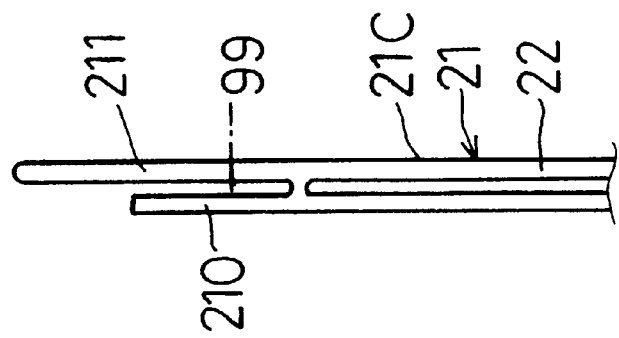
FIG. 13B is a cross-sectional view illustrating the air bag illustrated in FIG. 12 in the spread out state.
Figure 13A:
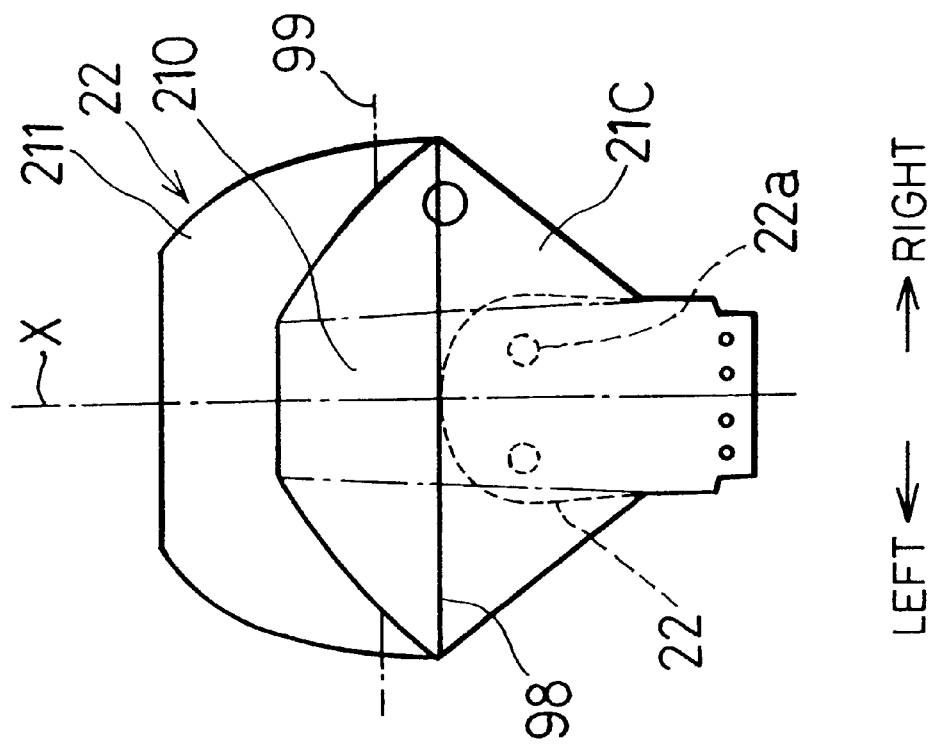
FIG. 13A is a plane view illustrating the air bag illustrated in FIG. 12 in a spread-out state.
Figure 16A:
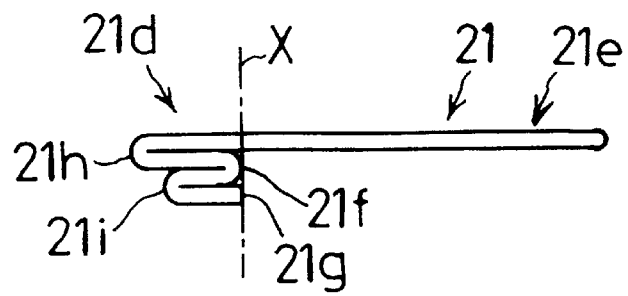
FIG. 16A is a cross-sectional view illustrating the air bag illustrated in FIG. 12 prior to assuming a third folded state.
Figure 16B:
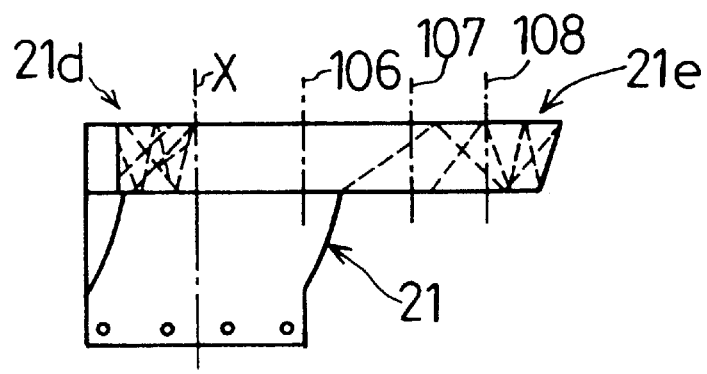
FIG. 16B is a plane view illustrating the air bag illustrated in FIG. 12 prior to assuming the third folded state.

A fifth preferred embodiment of the present invention is described based on FIGS. 12–17B. As shown in FIG. 12, the way of folding the main bag 21 in this embodiment is different from the first preferred embodiment. A method of folding the main bag 21 is described based on FIGS. 13A–17B. First, as shown in FIGS. 13A and 13B, the inner bag 22 is contained in the center portion of the main bag 21. The main bag 21 is spread out away from the inflator 3 and laterally, and the upper part of the main bag 21 is divided between a small bag portion 210 and a large bag portion 211. The small bag portion 210 and the large bag portion 211 extend from a bottom portion 21c of the main bag 21 in the direction away from the inflator 3, and the large bag portion 211 is longer than the small bag portion 210.

Next, as shown in FIGS. 14A, 14B, 15A and 15B, the small bag portion 210 and the large bag portion 211 are folded in opposite directions. The small bag portion 210 is folded along a fold line 98 and the large bag portion 211 is folded along a fold line 99 so that an edge of the small bag portion 210 is arranged the same distance from the inflator 3 as an edge of the large bag portion 211. Then, the small bag portion 210 and the large bag portion 211 are folded up the zigzag shape along fold lines 100–102 so that the small bag portion 210 and the large bag portion 211 overlap the inflator 3 (see FIGS. 15A and 15B).

Figure 17A:
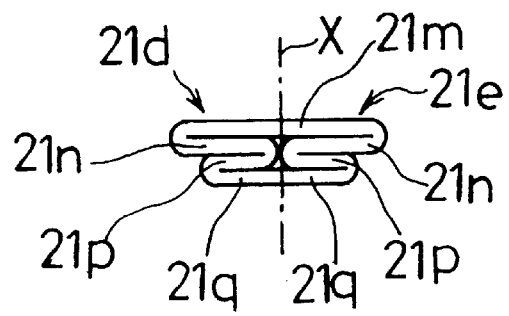
FIG. 17A is a cross-sectional view illustrating the air bag illustrated in FIG. 12 in a completely folded state.
Figure 17B:
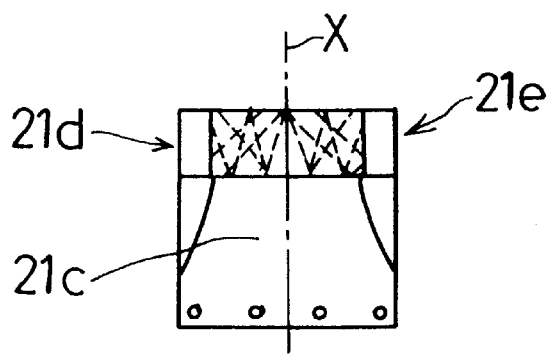
FIG. 17B is a plane view illustrating the air bag illustrated in FIG. 12 in the completely folded state.

Next, as shown in FIGS. 15A, 15B, 16A and 16B, a left portion 21d is inwardly folded up in the zigzag shape along fold lines 103–105 so that width of the left portion 21 decreases. Then, as shown in FIGS. 16A, 16B, 17A and 17B, a right portion 21e is inwardly folded up in the zigzag shape along fold lines 106–108 so that the right portion 21e is symmetrical with the left portion 21d. As shown in FIG. 17A, a folded air bag is formed in which a first folding portion 21m extends from the bottom portion 21c of the main bag 21, second folding portions 21n inwardly extend from both edges of the first folding portion 21m, third folding portions 21p outwardly extend from edges of the second folding portions 21n, fourth folding portions 21q inwardly extend from the third folding portions 21p. As a result, because the inner bag 22 is disposed in the bottom portion 21c of the main bag 21 and the first folding portion 21m, the gas which flows into the bottom portion 21c of the main bag 21 and the first folding portion 21m from the holes 22a of the inner bag 22 inflates the bottom portion 21c and the first folding portion 21m and after that, the gas inflates the other folding portions 21n, 21p, 21q.

In this embodiment, the first folding portion 21m of the main bag 21 is disposed near the lid 1 of the case 4. On the other hand, other folding portions 21n, 21p, 21q are disposed away from the lid 1 of the case 4. Therefore, the first folding portion 21m is inflated at first, and then, other folding portions 21n, 21p, 21q are inflated from the predetermined portion of the first folding portion 21m which has been inflated in the different direction. Thus, it is possible to get the same effects as the first preferred embodiment. Also, in this embodiment, the small portion 210 and the large portion 211 are inflated after the bottom portion 21c of the main bag 21 is inflated, thus, it is possible to get the same effects as the first preferred embodiment.

(Sixth Embodiment)

Figure 18:
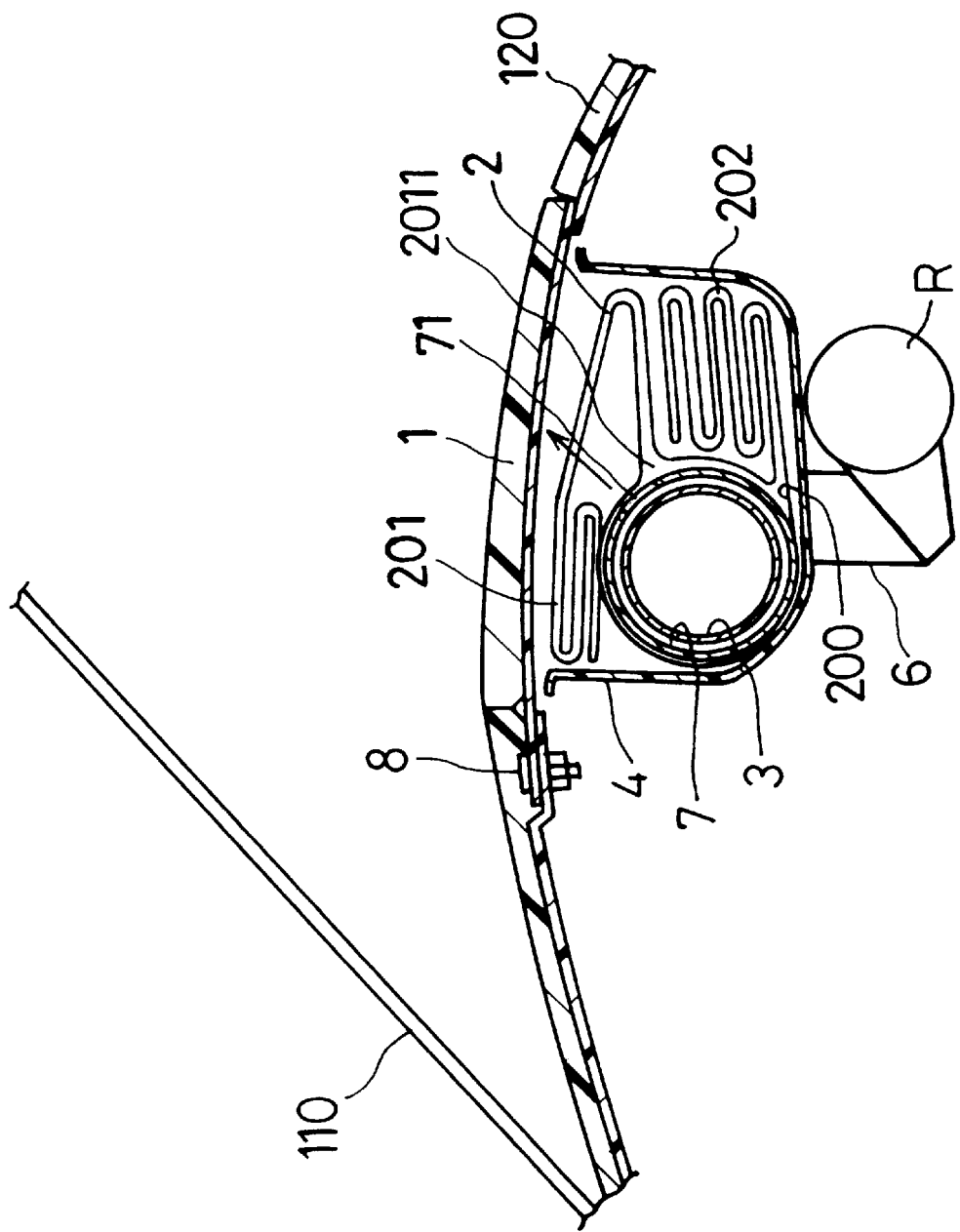
FIG. 18 is a cross-sectional view illustrating an air bag device for vehicles according to a sixth preferred embodiment of the present invention.

A sixth preferred embodiment of the present invention is described based on FIGS. 18–21. FIG. 18 shows a longitudinal cross-sectional view illustrating an air bag device (not inflated) for vehicles.

An air bag device illustrated in FIG. 18 includes the lid 1, the air bag 2, the inflator 3 and the case 4 as described in the first embodiment, and also includes a container can 7 which contains the inflator 3. One part of the lid 1 is fixed to the instrumental panel 120 by a hinge 8 so that the lid 1 can be opened. The air bag 2 according to this embodiment is different from the first preferred embodiment in that the air bag 2 is not a dual bag type but a single bag type. The inflator 3 is disposed in the container can 7 and fixed therein. The container can 7 is covered with the air bag 2 and disposed in the case 4. A wall of the container can 7 is fixed to a bottom peripheral portion of the case 4 and has holes 71 thereon for flowing the gas. The case 4 is almost the same structure except it is shallower than the case 4 described in the first preferred embodiment. Therefore, a base portion 200 of the air bag 2 is fixed to the case 4 by being sandwiched between an outer wall of the container can 7 and an inner wall of the case 4. The air bag 2 consists of the base portion 200, a upper folding portion 201 and a lower folding portion 202. The base portion 200 includes the container can 7 and is fixed to the case 4. The upper folding portion 201 is downwardly folded up in the zigzag shape so that the end of the upper folding portion 201 is located in a lower portion thereof and is disposed above the container can 7. The lower folding portion 202 is upwardly folded up in the zigzag shape so that the end of the lower folding portion 202 is located in an upper portion thereof and is disposed beside the container can 7.

Figure 20:
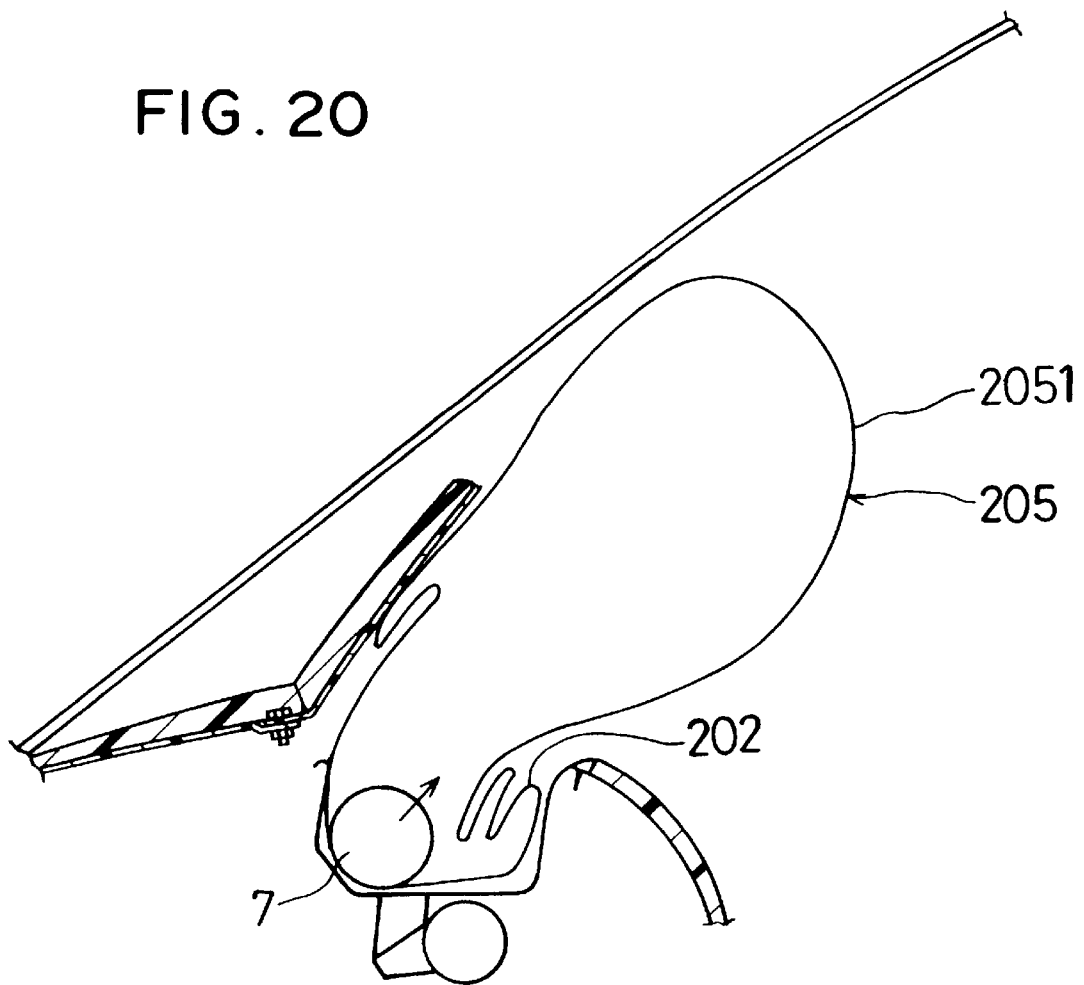
FIG. 20 is a cross-sectional view illustrating a middle stage of the inflation of the air bag 2 illustrated in FIG. 18.
Figure 21:
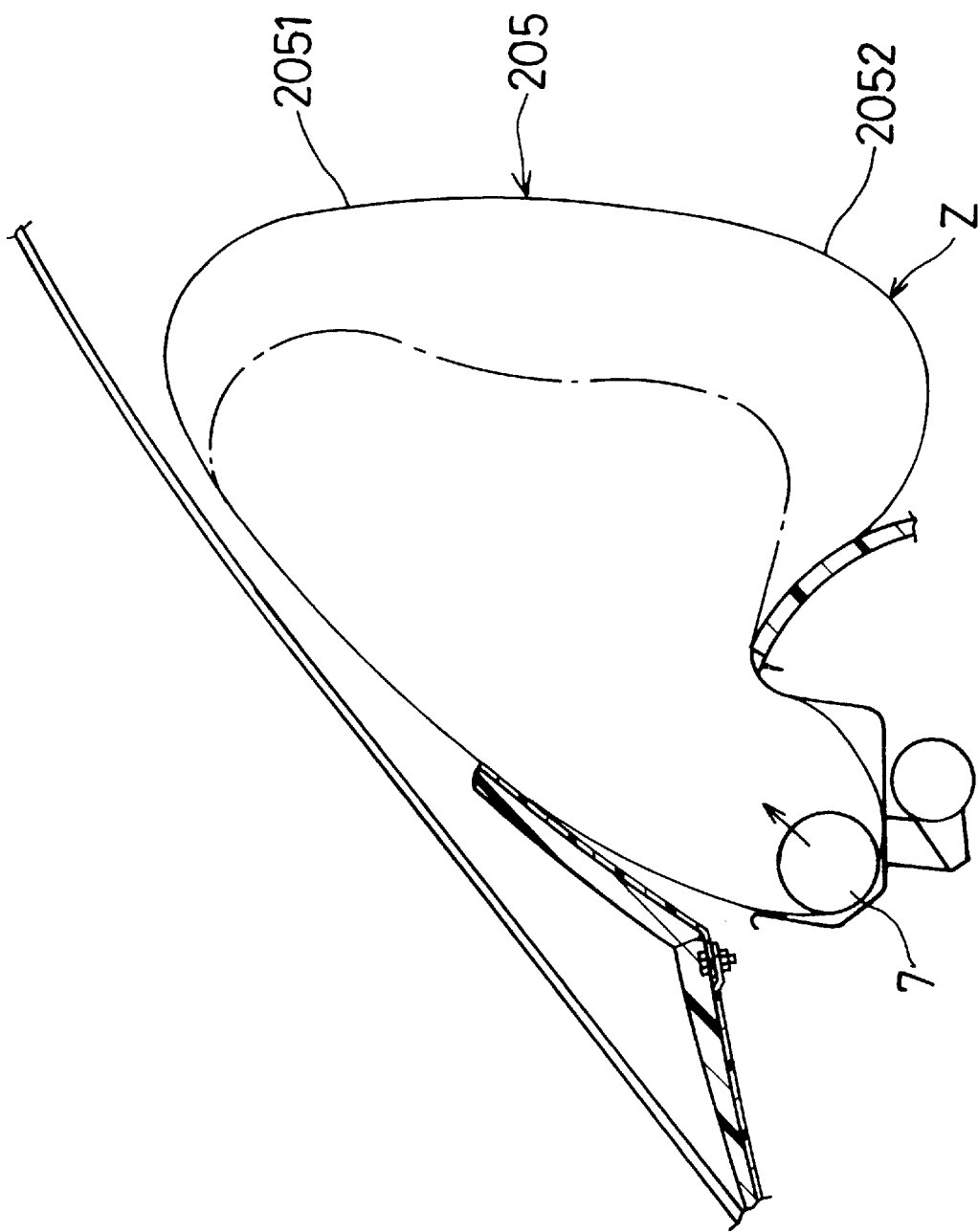
FIG. 21 is a cross-sectional view illustrating a late stage of the inflation of the air bag 2 illustrated in FIG. 18.

The holes 71 for allowing the gas to flow, disposed in the container can 7, are close to a entrance portion 2011 of the upper folding portion 201. The entrance portion 2011 of the upper folding portion 201 is close to the lower folding portion 202 and the base portion 200. When the air bag is inflated, as shown in FIGS. 18, 20 and 21, the entrance portion 2011 of the upper folding portion 201 corresponds to a bottom of a upper portion 2051 of a contact face 205 (or position between the upper portion 2051 of the contact face 205 and a lower portion 2052 of the contact face 205). Thus, the enter portion 2011 of the upper folding portion 201 is inflated than any other portions.

A method of folding the main bag 21 is as follows. First, the air bag 2 is spread out so that the container can 7 is disposed at a center thereof. In this situation, the upper folding portion 201 and the lower folding portion 202 are spread out in the opposite direction as well as the first preferred embodiment illustrated in FIGS. 2A and 2B. Next, a right portion of the air bag 2 and a left portion of the air bag 2 are inwardly folded as well as the first preferred embodiment illustrated in FIGS. 2C. After that, the upper folding portion 201 and the lower folding portion 202 are folded nearer to the container can 7, then fixed to the case 4.

Figure 19:
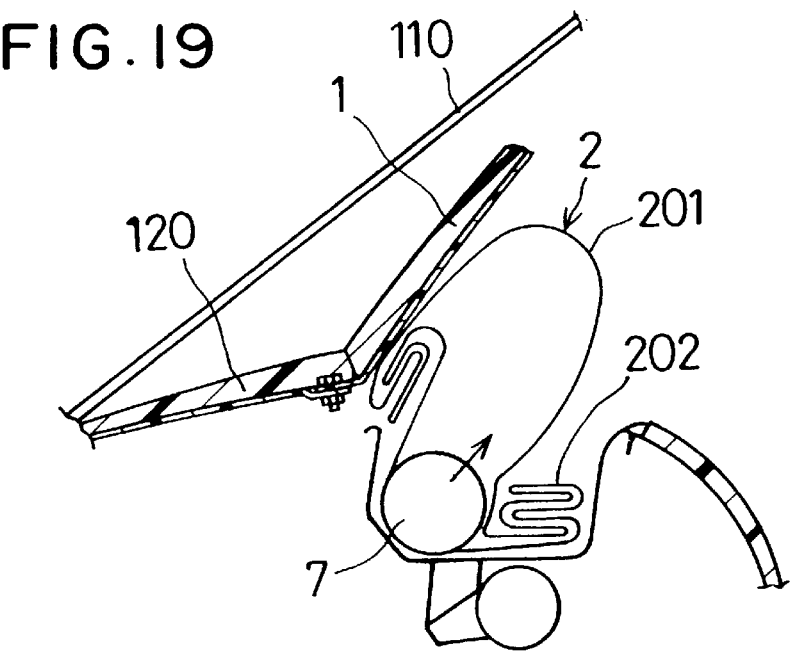
FIG. 19 is a cross-sectional view illustrating a early stage of inflation of the air bag 2 illustrated in FIG. 18.

An operation of the air bag device according to this embodiment is described based on FIGS. 19–21. As shown in FIG. 19, the gas generated from the inflator 2 upon the collision of the vehicle mainly flows into the upper folding portion 201 from the holes 71 of the container can 7, and inflates the upper folding portion 201 more quickly than the lower folding portion 202. Because the upper folding portion 201 which has been inflated may delay the inflation of the lower folding portion 202, as shown in FIG. 20, the inflation of the upper folding portion 201 is almost finished before the lower folding portion 202 starts to inflate. After that, as shown in FIG. 21, the lower folding portion 202 is inflated, finally the upper folding portion 201 and the lower folding portion 202 turn into a complete inflated shape Z.

In FIG. 21, numeral 205 represents the contact face to the passenger, and the contact face 205 extends almost vertically when the air bag 2 is completely inflated. Therefore, the upper folding portion 201 is inflated from the early stage (see FIG. 19) to the middle stage (see FIG. 20); on the other hand, the lower folding portion 202 is inflated in the laterstage (see FIG. 21) faster than the upper folding portion 201.

According to the above-described embodiment, there are various effects as follows.

(First effect)

Because the upper folding portion 201 is inflated earlier than the lower folding portion 202, and the upper portion 2051 of the contact face 205 is inflated earlier than the lower portion 2052 of the contact face 205, the passenger's head is not thrusted up.

(Second effect)

Because the bottom of the upper folding portion 201 is inflated earlier than the head of the upper folding portion 201, the bottom of the upper portion 2051 of the contact face 205 is inflated earlier than the head of the upper portion 2051 of the contact face 205. If the head of the upper portion 2051 of the contact face 205 is inflated earlier than the bottom of the head of the upper portion 2051 of the contact face 205, the gas flows in the following order: first, the head of the upper portion 2051 of the contact face 205; second, the bottom of the head of the upper portion 2051 of the contact face 205; and third, the lower portion 2052 of the contact face 205; thus, the head of the upper portion 2051 of the contact face 205 projects more toward the passenger's face than other portions of the contact face 205 when the air bag 2 starts being inflated. In this embodiment, first, the bottom of the upper portion 2051 of the contact face 205 is inflated, then, the head of the upper portion 2051 of the contact face 205 and the lower portion 2052 of the contact face 205 are inflated. Therefore, the contact face 205 quickly becomes flat without projecting one portion when the air bag 2 starts being inflated, so the passenger is not damaged by a shock of the air bag which hits a part of the passenger's body.

In the above-described embodiment, the air bag 2 is folded up into two parts (the upper folding portion 201 and the lower folding portion 202) if the air bag 2 is folded up in three parts (a upper part, a center part and a lower part), and the center part is inflated earlier than other parts, the same effect is obtained as above-described operation.

(Third effect)

Because as shown in FIG. 18, because the end of the lower folding portion 202 is arranged higher than the base portion thereof, it is useful for the lower folding portion 202 to be slowly inflated. Also, as shown in FIG. 18, because the end of the upper folding portion 201 is arranged lower than the base portion thereof, it is useful for the upper folding portion 201 to be quickly inflated.

(Fourth effect)

Because the upper folding portion 201 has been provided to the gas in preference to the lower folding portion 202, the upper portion 2051 of the contact face 205 can be inflated in preference to the lower portion 2052 of the contact face 205.

(Fifth effect)

Because the gas flows into the entrance portion 2011 of the upper folding portion 201 which is folded to correspond to the center portion of the contact face 205, the gas can flow from the center portion of the contact face 205 up and down the contact face 205.

(Seventh Embodiment)

Figure 22:
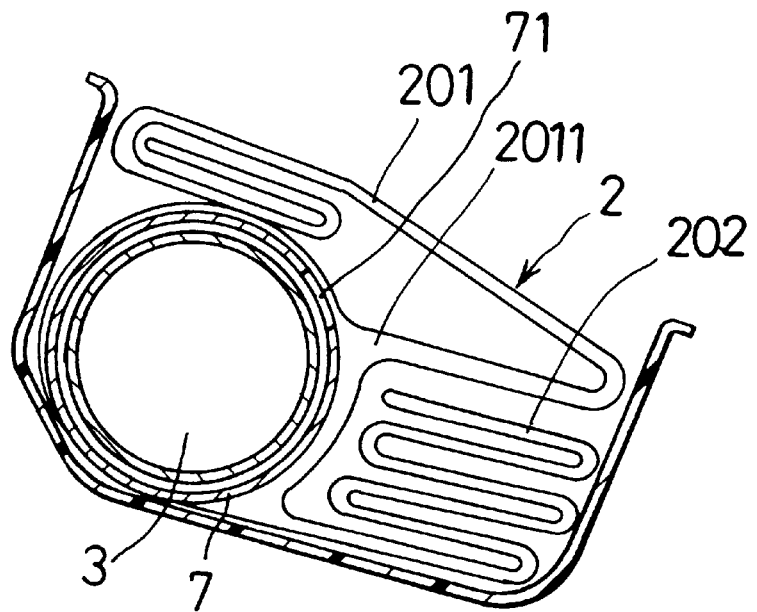
FIG. 22 is a cross-sectional view illustrating an air bag device for vehicles according to a seventh preferred embodiment of the present invention.

A seventh preferred embodiment of the present invention is described based on FIG. 22, which shows a longitudinal cross-sectional view illustrating an air bag device (not inflated) for vehicles. The air bag device described in this embodiment has almost the same structure as the air bag described in the sixth preferred embodiment except for the way of folding the air bag 2. The way of folding the upper folding portion 201 in this embodiment is different from the sixth preferred embodiment. As shown in FIG. 22, the upper folding portion 201 is folded up in a loop shape. Therefore, it is effective to enable the edge of the upper folding portion 201, that is, the head of the contact face 205, to delay inflation relative to the entrance portion 2011 of the upper folding portion 201, that is, the bottom of the upper portion 2051 of the contact face 205.

(Eighth Embodiment)

Figure 23:
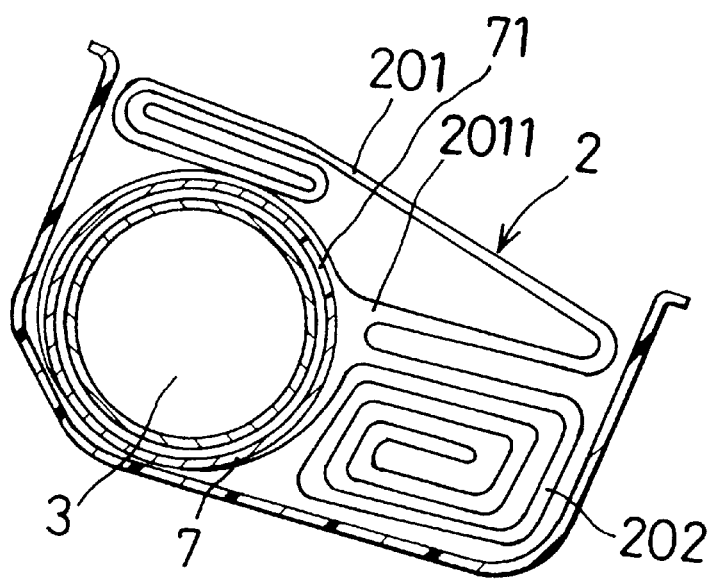
FIG. 23 is a cross-sectional view illustrating an air bag device for vehicles according to a eighth preferred embodiment of the present invention.

An eighth preferred embodiment of the present invention is described based on FIG. 23, which shows a longitudinal cross-sectional view illustrating an air bag device (not inflated) for vehicles. The air bag device described in this embodiment has almost the same structure as the air bag described in the seventh preferred embodiment except for the way of folding the air bag 2. As shown in FIG. 23, the lower folding portion 202 is folded up in a loop shape. Therefore, it is very effective to enable inflation of the edge of the upper folding portion 202, that is, the bottom 2052 of the contact face 205, to be delayed relative to the entrance portion 2011 of the upper folding portion 201, that is, the bottom of the upper portion 2051 of the contact face 205.

(Ninth Embodiment)

Figure 24:
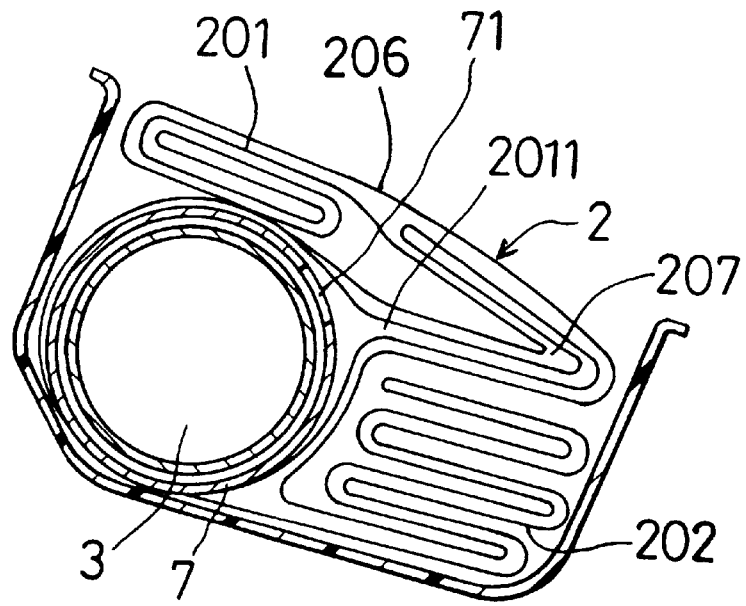
FIG. 24 is a cross-sectional view illustrating an air bag device for vehicles according to a ninth preferred embodiment of the present invention.

A ninth preferred embodiment of the present invention is described based on FIG. 24, which shows a longitudinal cross-sectional view illustrating an air bag device (not inflated) for vehicles. The air bag device described in this embodiment has almost the same structure as the air bag described in the seventh preferred embodiment except for the way of folding the air bag 2. As shown in FIG. 24, the air bag 22 consists of a main air bag 206 and an inner air bag 207 which is disposed in the main air bag 206. The main air bag 206 is folded by the same method as the air bag 2 which is described in the seventh preferred embodiment. A part of the inner air bag 207 is inserted into the upper folding portion 201 of the main bag 206 without being inserted into the lower folding portion 202 of the main air bag 206. The inner air bag 207 has plurality of holes (not shown) for allowing the gas to flow therein and is disposed between the main air bag 206 and the container can 7. Therefore, because the gas flows into the upper folding portion 201, especially the entrance portion 2011 of the upper folding portion 201, earlier than inner air bag 207, the bottom of the upper portion 2051 of the contact face 205 can be inflated earlier than other portions.

In this embodiment, the container can 7 is not necessary because of the inner air bag 207. The inner air bag described in this embodiment can be adopted in the sixth through eighth preferred embodiments.

(Tenth Embodiment)

Figure 25:
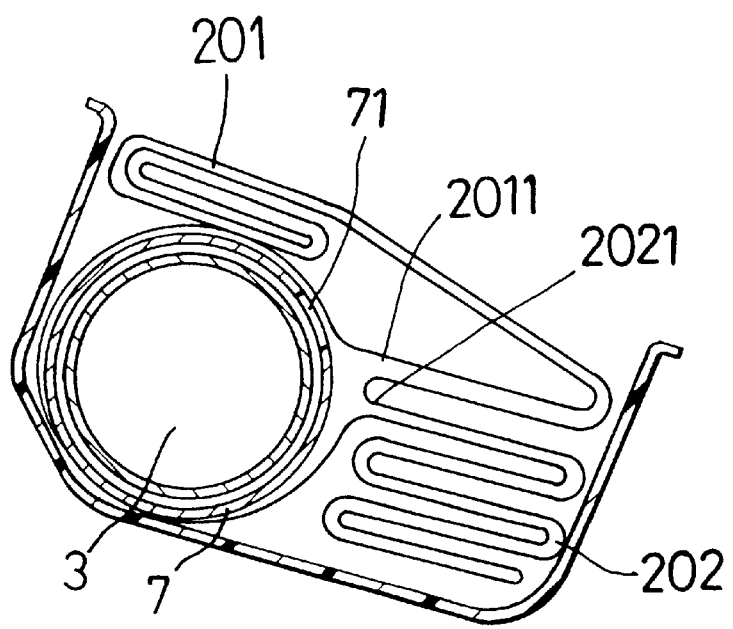
FIG. 25 is a cross-sectional view illustrating an air bag device for vehicles according to a tenth preferred embodiment of the present invention.

A tenth preferred embodiment of the present invention is described based on FIG. 25, which shows a longitudinal cross-sectional view illustrating an air bag device (not inflated) for vehicles. The air bag device described in this embodiment has almost the same structure as the air bag described in the seventh preferred embodiment except the way of folding the air bag 2. As shown in FIG. 25, a base portion 2021 of the lower folding portion 202 is disposed near a lower portion of the entrance portion 2011 of the upper folding portion 201, and the lower folding portion 202 is folded up in the zigzag shape so that the edge of the lower folding portion 202 is located at a lowermost position.

According to this embodiment, when the bottom portion of the upper folding portion 201 is inflated, the base portion 2021 of the lower folding portion 202 is pulled by the bottom portion of the upper folding portion 201 and is opened, so the base portion 2021 of the lower folding portion 202 starts to be inflated without delaying the inflation of the edge of the upper folding portion 201 much. Therefore, the contact face 205 can be speedy and flatly inflated.

The inner air bag described in the ninth preferred embodiment can be adopted in this embodiments.

(Eleventh Embodiment)

Figure 26:
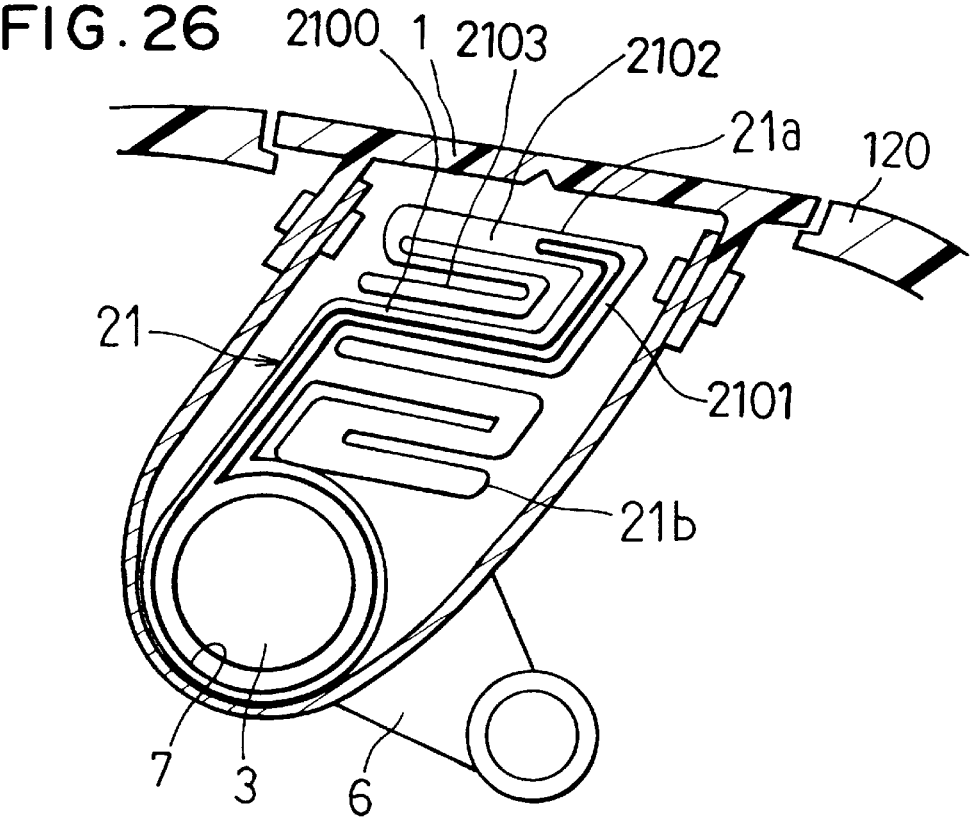
FIG. 26 is a cross-sectional view illustrating an air bag device for vehicles according to a eleventh preferred embodiment of the present invention.

An eleventh preferred embodiment of the present invention is described based on FIG. 26, which shows a longitudinal cross-sectional view illustrating an air bag device (not inflated) for vehicles. The air bag device described in this embodiment has almost the same structure as the air bag described in the first preferred embodiment except the way of folding the air bag 2. As shown in FIG. 26, this embodiment is characterized in that a lateral portion 2100 of the first portion 21 extends backward in the case 4, a vertical portion 2101 of the first portion 21 which is next to the lateral portion 2100 extends upward in the case 4, a lateral portion 2102 of the first portion 21 which is next to the vertical portion 2101 extends forward in the case 4, and another portion of the main bag 21 which is next to the lateral portion 2102 is folded up in the zigzag shape between the lateral portion 2100 and the lateral portion 2102.

According to this embodiment, because the first portion 21*a* of the main bag 21 is downwardly inflated more than in the first preferred embodiment, the passenger' head is not thrusted up.

(Twelfth Embodiment)

Figure 27:
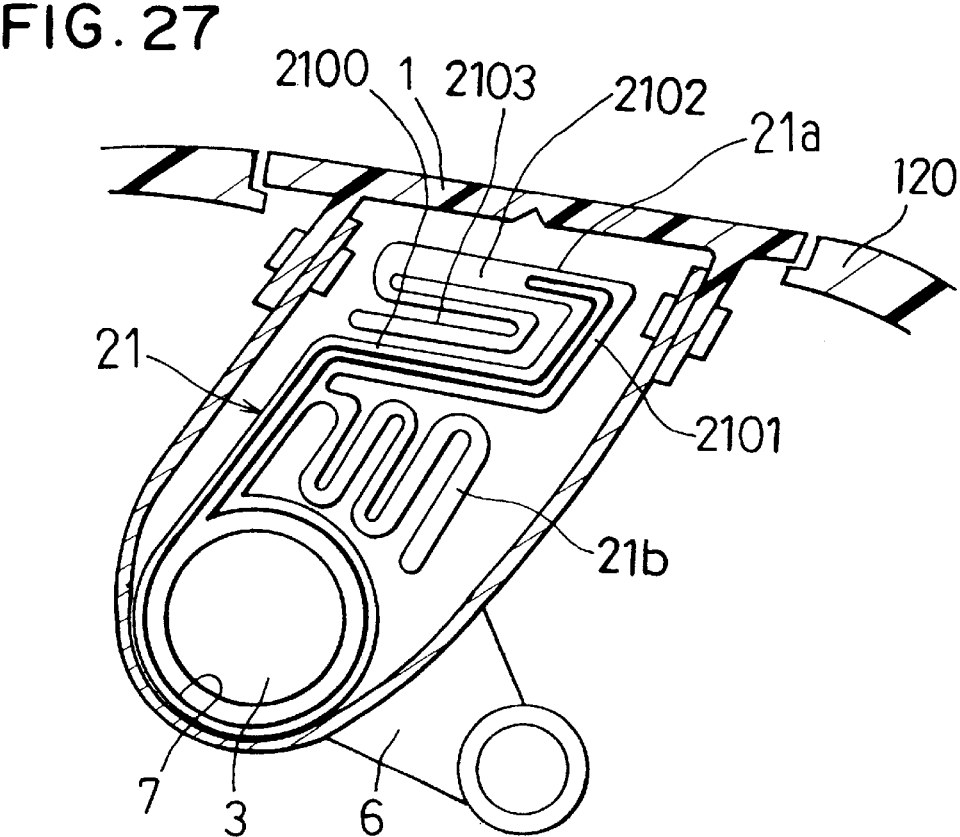
FIG. 27 is a cross-sectional view illustrating an air bag device for vehicles according to a twelfth preferred embodiment of the present invention.

A twelfth preferred embodiment of the present invention is described based on FIG. 27, which shows a longitudinal cross-sectional view illustrating an air bag device (not inflated) for vehicles. The air bag device described in this embodiment has almost the same structure as the air bag described in the seventh preferred embodiment except for the way of folding the air bag 2. As shown in FIG. 27, this embodiment is characterized in that the second portion 21*b* of the main bag 21 is backwardly folded up in the zigzag shape, and the head of the second portion 21*b* in located in a most rearward position. According to this embodiment, because the second portion 21*b* of the main bag 21 can be speedy inflated after it is pulled out from the case 4, the contact face 205 can be quickly vertically flattered.

(Thirteenth Embodiment)

Figure 28:
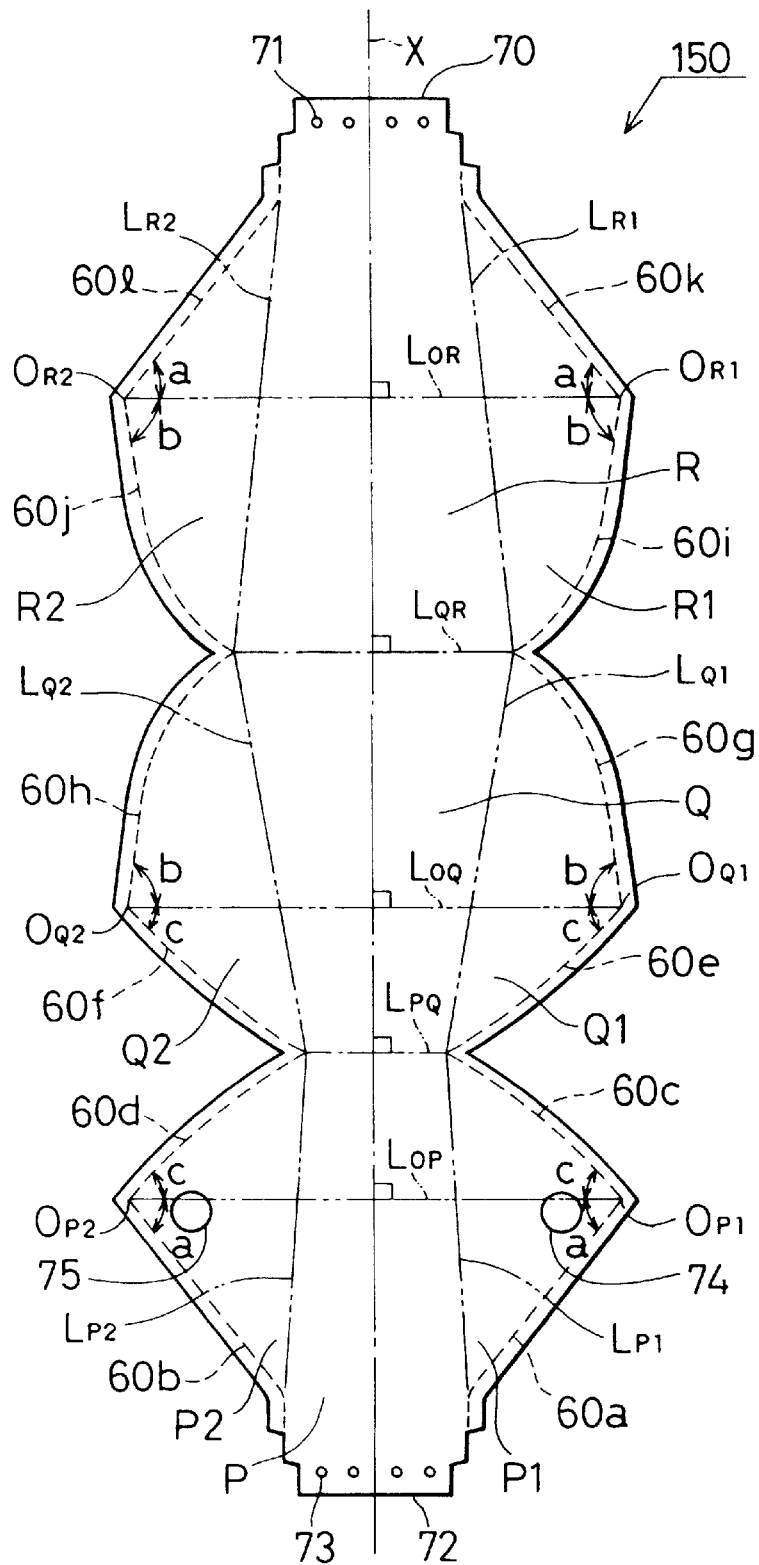
FIG. 28 is a plane view illustrating an air bag in a spread-out state according to a thirteenth preferred embodiment of the present invention.
Figure 30:
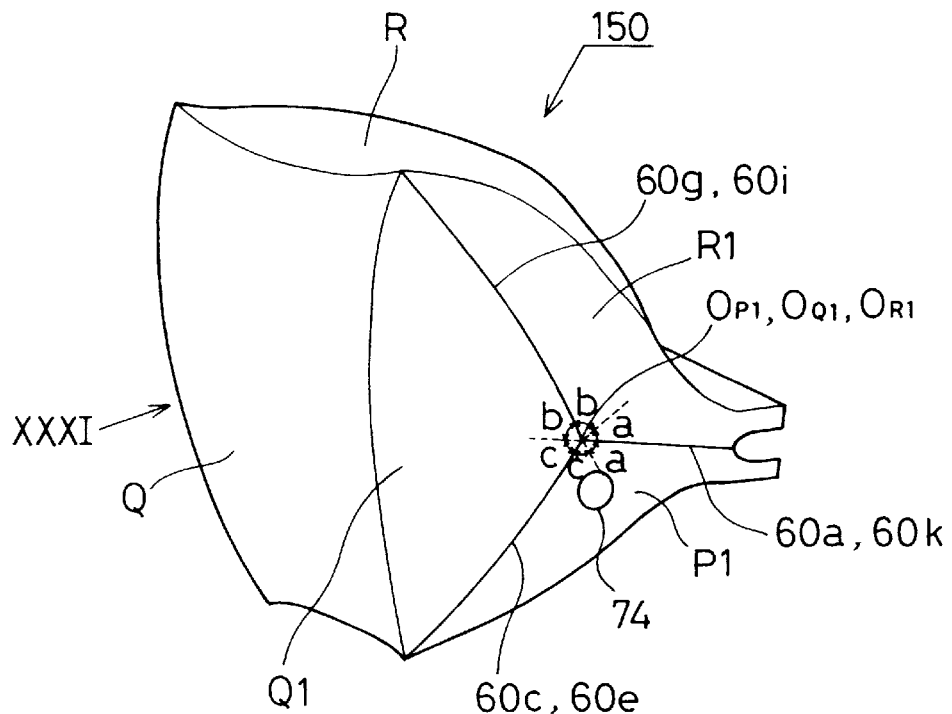
FIG. 30 is a perspective view illustrating the air bag illustrated in FIG. 28 in an inflated state.

A thirteenth preferred embodiment of the present invention is described based on FIGS. 28–34. As shown in FIGS. 28–30, an air bag 150 which is laterally symmetrical relative to an axis X is configured in predetermined shape by cutting a cloth, for instance, a nylon cloth, and consists of a belt portion and a side portion. The belt portion consists of a rectangular bottom section P, a trapezoidal front section Q, and a trapezoidal upper section R, and the three sections are consecutively formed in the direction of axis X. Because one side $L_{QR}$ of the front section Q which contacts the upper section R, is longer than the other side $L_{PQ}$ of the front section Q, which contacts the bottom section P, a shock against the passenger upon the inflation of the air bag 150 is effectively absorbed.

The bottom section P includes an opening portion 72 at an open end side thereof, and the upper section R also includes an opening portion 70 at an open end side thereof. A plurality of holes 71 are formed in the opening portion 70, and a plurality of holes 73 are also formed in the opening portions 72. The holes 71, 73 are used for fixing the air bag 150 to a fixing member (not shown), for instance a retainer, by bolts and nuts. When gas generated by an inflator (not shown) flows into the inside of the air bag 150 via the opening portions 70, 72, the inside of the air bag 150 is filled with the gas, and the air bag 150 is inflated.

The side portion consists of first side sections P1, P2, second side sections Q1, Q2, and third side sections R1, R2, and all of them are almost triangular. The first side section P1 has a hole 74, and the first side section P2 also has a hole 75. Each of the first side sections P1, P2 is disposed next to the bottom section P with contacting sides $L_{P1}$, $L_{P2}$. The holes 74, 75 are used for exhausting the gas after inflation of the air bag 150 to control the gas pressure inside the air bag 150. On the first side section P1, sewing lines 60*a*, 60*c* are disposed at a sewing margin apart from two sides of the first side section P1, which do not contact the bottom section P. Also, on the first side section P2, sewing lines 60*b*, 60*d* are disposed at a sewing margin apart from two sides which are not contacting the bottom section P in the first side section P2. The sewing lines 60*a*, 60*b* are straight, and the sewing lines 60*c*, 60*d* are a little outwardly convex.

A top angle surrounded by the line 60*a* and the line 60*c* is divided into an angle a and an angle c by a vertical line $L_{OP}$ which extends to the axis X from a top point $O_{P1}$ opposite to the side $L_{P1}$ of the first side section P1. Also, a top angle surrounded by the line 60*b* and the line 60*d* is divided into the angle a and the angle c by the vertical line $L_{OP}$ which extends to the axis X from a top point $O_{P2}$ opposite to the side $L_{P2}$ of the first side section P2.

The second side sections Q1, Q2 are disposed next to the front section Q with contacting sides $L_{Q1}$, $L_{Q2}$. On the second side section Q1, sewing lines 60*e*, 60*g* are disposed at a sewing margin apart from two sides which do not contact the front section Q in the second side section Q1. Also, on the second side section Q2, sewing lines 60*f*, 60*h* are disposed sewing margin apart from two sides which do not contact the front section Q in the second side section Q2. The sewing lines 60*e*, 60*f*, 60*g* and 60*h* are a little outwardly convex.

A top angle surrounded by the line 60*e* and the line 60*g* is divided into an angle b and the angle c by a vertical line $L_{OQ}$ which extends to the axis X from a top point $O_{Q1}$ opposite to the side $L_{Q1}$ of the second side section Q1. Also, a top angle surrounded by the line 60*f* and the line 60*h* is divided into the angle b and the angle c by the vertical line $L_{OQ}$ which extends to the axis X from a top point $O_{Q2}$ opposite to the side $L_{Q2}$ of the second side section Q2.

The third side sections R1, R2 are disposed next to the upper section R while contacting the sides $L_{R1}$, $L_{R2}$. On the third side section R1, sewing lines 60*i*, 60*k* are disposed at a sewing margin apart from two sides which are not contacting the upper section R in the third side section R1. Also, on the third side section R2, sewing lines 60*j*, 60*l* are disposed at a sewing margin apart from two sides which are not contacting the upper section R in the third side section R2. The sewing lines 60*k*, 60*l* are straight, and the sewing lines 60*i*, 60*j* are a little outwardly convex.

A top angle surrounded by the line 60*i* and the line 60*k* is divided into the angle a and the angle b by a vertical line $L_{OR}$ which extends to the axis X from a top point $O_{R1}$ opposite to the side $L_{R1}$ of the third side section $R_1$. Also, a top angle surrounded by the line 60*j* and the line 60*l* is divided into the angle a and the angle b by the vertical line $L_{OR}$ which extends to the axis X from a top point $O_{R2}$ opposite to the side $L_{R2}$ of the third side section R2.

As described above, the angle surrounded by the vertical line $L_{OP}$ and the line 60*a* or the line 60*b* is the same as the angle surrounded by the vertical line $L_{OR}$ and the line 60*k* or the line 60*l*; that is, they are set the angle a; the angle surrounded by the vertical line $L_{OP}$ and the line 60*c* or the line 60*d* is the same as the angle surrounded by the vertical line $L_{OQ}$ and the line 60*e* or the line 60*f*, that is, they are set the angle c; and the angle surrounded by the vertical line $L_{OQ}$ and the line 60*g* or the line 60*h* is the same as the angle surrounded by the vertical line $L_{OR}$ and the line 60*i* or the line 60*j*, that is, they are set the angle b. Further, the total of the angle surrounded by the line 60*a* (line 60*b*) and the line 60*c* (line 60*d*), the angle surrounded by the line 60*e* (line 60*f*) and the line 60*g* (line 60*h*), and the angle surrounded by the line 60*i* (line 60*j*) and the line 60*k* (line 60*l*), that is, 2×(angle a+angle b+angle c) is set between 330 degrees and 360 degrees. The lines 60c and 60e, and the line 60d and 60f are symmetrically arranged to the side $L_{PQ}$, the lines 60g and 60i, and lines 60h and 60j are symmetrically arranged to the side $L_{QR}$.

The method of sewing the air bag 150 is described based on FIGS. 28 and 29. First, the bottom section P and the first sections P1, P2 are folded along the side $L_{PQ}$ SO that the top point $O_{P1}$ of the first section P1 coincides with the top point $O_{Q1}$ of the first section P2, and the top point $O_{P2}$ of the first section P1 coincides with the top point $O_{Q2}$ of the first section P2. Next, the front section Q and the second sections Q1, Q2 are folded along the side $L_{OQ}$ in the opposite direction to the folding of the bottom section P and the first sections P1, P2, then the upper section R and the third sections R1, R2 are folded along the side $L_{QR}$ in the same direction to the folding of the bottom section P and the first sections P1, P2 so that the top points $O_{P1}$ and $O_{Q1}$ coincide with the top point $O_{R1}$ of the third section R1, and the top points $O_{P2}$ and $O_{Q2}$ coincide with the top point $O_{R2}$ of the third section R1. According to the above-described folding, the line 60a coincides with the line 60k, the line 60b coincides with the line 60l, the line 60c coincides with the line 60e, the line 60d coincides with the line 60f, the line 60g coincides with the line 60i, and the line 60h coincides with the line 60j. In this situation, as shown in FIGS. 29A and 29B, the line 60a is sewn up the line 60k, the line 60b is sewn up the line 60l, the line 60c is sewn up the line 60e, the line 60d is sewn up the line 60f, the line 60g is sewn up the line 60i, and the line 60h is sewn up the line 60j. After that, an outer surface of the air bag 150 is reversed inside, and the air bag is attached to the retainer of the air bag device at the holes 21, 23.

When the gas is generated from the inflator upon the detection of the collision of the vehicle, the gas flows into the air bag 150 via holes 20, 22, and the air bag 150 is inflated as shown in FIG. 30. When the air bag 150 is inflated, the front section Q is positioned in front of a passenger, the bottom section P is positioned below the front section Q, and the upper section R is positioned above the front section Q. Because the top point OP1 coincides with the top points $O_{Q1}$ and $O_{R1}$, a side surface is formed with side sections P1, Q1 and R1 as shown in FIG. 30. Also, the top point $O_{P2}$ coincides with the top points $O_{Q2}$ and $O_{R2}$, a side surface is formed with side sections P2, Q2 and R2.

Figure 31:
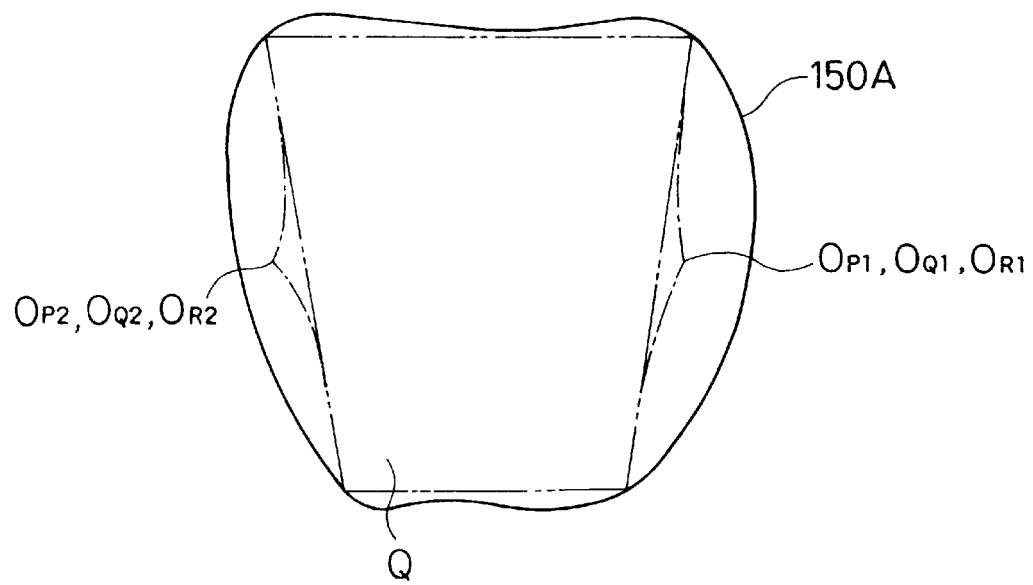
FIG. 31 is a view illustrating the air bag illustrated in FIG. 30 as viewed in the direction of an arrow XXXI.

FIG. 31 is a view illustrating the air bag as viewed in the direction of an arrow XXXI illustrated in FIG. 30. As shown in FIG. 31, when the air bag 150 is inflated, an outline 150A of the air bag 150 is expanded. However, in this embodiment, because the total of three angles at the top points $O_{P1}$, $O_{Q1}$, $O_{R1}$ of the side sections P1, Q1, R1, that is, 2×(angle a+angle b+angle c) is set between 330 degrees and 360 degrees, when the air bag 150 is inflated, sewn portions of the air bag 150 can be kept smooth without being wrinkled. Therefore, concentration of stress by the gas pressure to the sewn portions near the top portions is prevented, the stress by the gas pressure to the air bag 150 is uniformly dispersed, the sewn portions are prevented from being ruptured, and strength of the air bag 150 against the gas pressure is improved.

Figure 32:
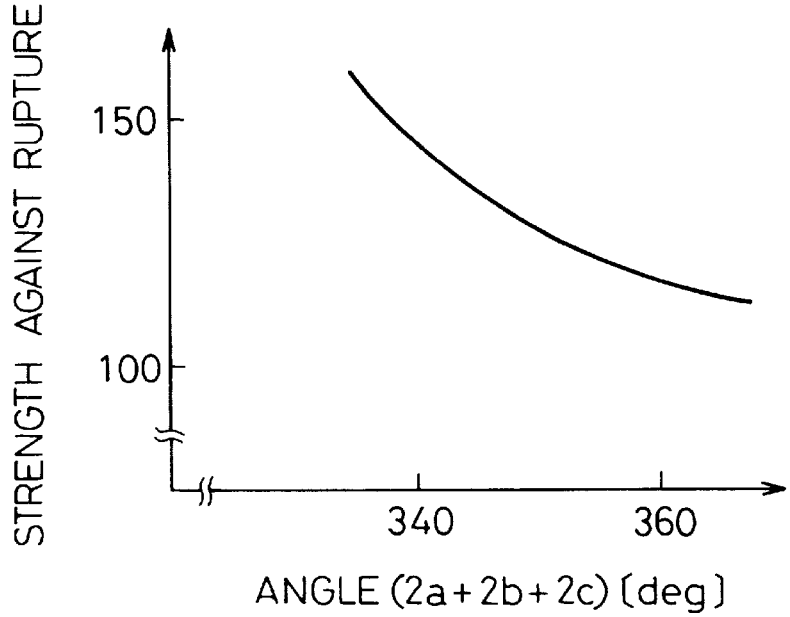
FIG. 32 is a graph showing a relationship between a sewing angle and strength of the air bag against rupture.

FIG. 32 is a graph showing a relationship between the total of angles at the top point and strength against rupture of the air bag 150. As shown in FIG. 32, the larger the total of angles at the top point is, the smaller the strength against rupture of the air bag is. If the total of angles at the top point is more than 360 degrees, the sewn portions are wrinkled and the strength against rupture is less than 120 kPa when the air bag 150 is inflated. On the other hand, if the total of angles at the top point is less than 360 degrees, the sewn portions are not wrinkled and the strength against rupture is more than 120 kPa when the air bag 150 is inflated.

Further, the smaller the total of angles at the top point is, the greater the strength against rupture of the air bag is. However, the lower limit of the total of angles at the top point is restricted by the shape of the air bag 150. If the total of angles at the top point is less than 330 degrees, the following problems may occur. That is, if the shape of the bottom section P. the front section Q and the upper section R are maintained, the areas of side sections P1, P2, Q1, Q2, R1 and R2 become large; thus, the air bag 150 becomes laterally larger and may not be quickly inflated; if the areas of side sections P1, P2, Q1, Q2, R1 and R2 are maintained, the areas of the bottom section P, the front section Q and the upper section R become small; thus, the air bag 150 becomes smaller and may not properly protect the passenger. Thus, it is necessary to set the total of angles at the top point at least between 330 degrees and 360 degrees; in particular, the total of angles at the top point being between 345 degrees and 355 degrees is better because this range is the middle of the above-described range. Though the gas pressure which operates the air bag 150 is less than 100 kPa, as shown in FIG. 32, the strength against rupture is more than 100 kPa. This is why the strength against rupture will decline because of wear and tear of the air bag, and the strength against rupture is set in expectation of the wear and tear of the air bag in this embodiment.

Moreover, according to this embodiment, because the sewing lines 60a, 60b, 60k and 60l are straight, and the sewing lines 60c, 60d 60e, 60f, 60g, 60h, 60i and 60j are a little outwardly convex, when the air bag is inflated, each side section become a curved face, and the stress due to the gas pressure is eased.

In order to control the angles at the top points 2×(angle a+angle b+angle c), it is effective to control an outer angle which is made by dividing one of the top angles into two angles by a vertical line extending from the top portions to a longitudinal axis of the belt portion, that is, it is effective to control the angle surrounded by the line 60a and the vertical line $L_{OP}$, the angle surrounded by the line 60b and the vertical line $L_{OP}$, the angle surrounded by the line 60k and the vertical line $L_{OR}$, and the angle surrounded by the line 60l and the vertical line $L_{OR}$.

It is possible to adopt differently shaped side sections instead of the almost triangular side sections described above. For instance, in an air bag 151 shown in FIG. 33, there are no side sections at both sides of the upper section R; instead, quadrilateral side sections PR1, PR2 are formed at sides of the bottom section P. On the side sections PR1, the line 60c which is sewn up the line 60e, the line 60i which is sewn up the line 60g, and a line 60o which is sewn up the line 60m are disposed. On the side sections PR2, the line 60d which is sewn up the line 60f, the line 60j which is sewn up the line 60h, and a line 60p which is sewn up the line 60n are disposed. According to the air bag 151, a top point $O_{PR1}$ is attached to the top point $O_{Q1}$, a top point $O_{PR2}$ is attached to the top point $O_{Q2}$, a top point $O_{PR11}$ is attached to a top point $O_{QR1}$, and a top point $O_{P12}$ is attached to a top point $O_{QR2}$ when the air bag 151 is folded; then, the sewn portions are sewn. In this case, if the total of angles at the top points, that is, 2×(angle a+angle b+angle c) is set between 330 degrees and 360 degrees, the sewn portions are not wrinkled and strength of the air bag 151 against the gas pressure is improved. As described above, with regard to the shape of the side section, it is possible to adopt not only an almost triangular shape but also a quadrilateral shape only if the total of angles at the top point is between 330 degrees and 360 degrees.

Figure 33:
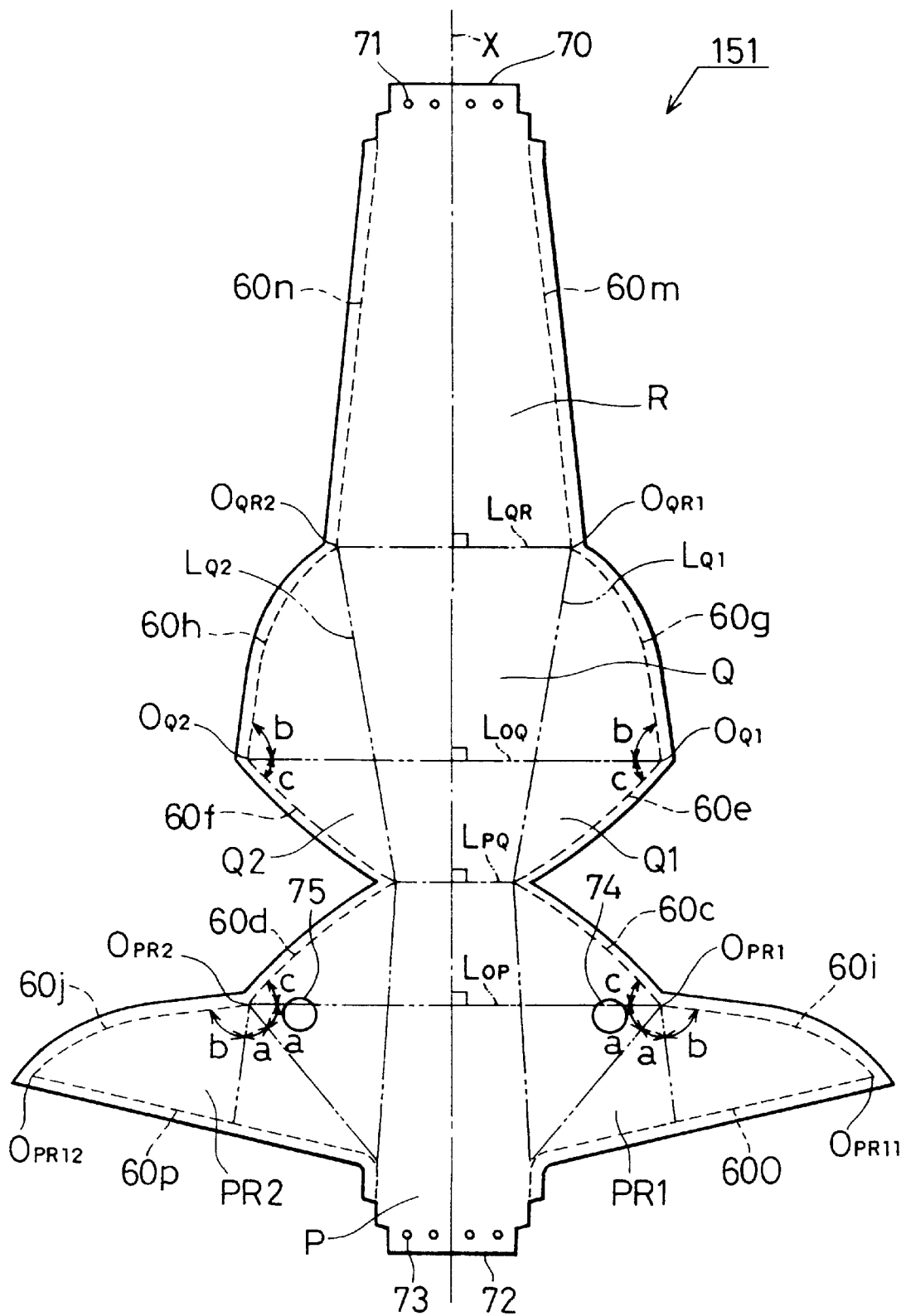
FIG. 33 is a plane view illustrating an air bag which includes square sections PR1 and PR2 instead of first triangular sections R1 and R2 which are illustrated in FIG. 28.

In FIG. 33, the side sections are consecutively formed at both sides of the belt portion; however, it is not necessary to consecutively form the side sections at both sides of the belt portion.

Figure 34:
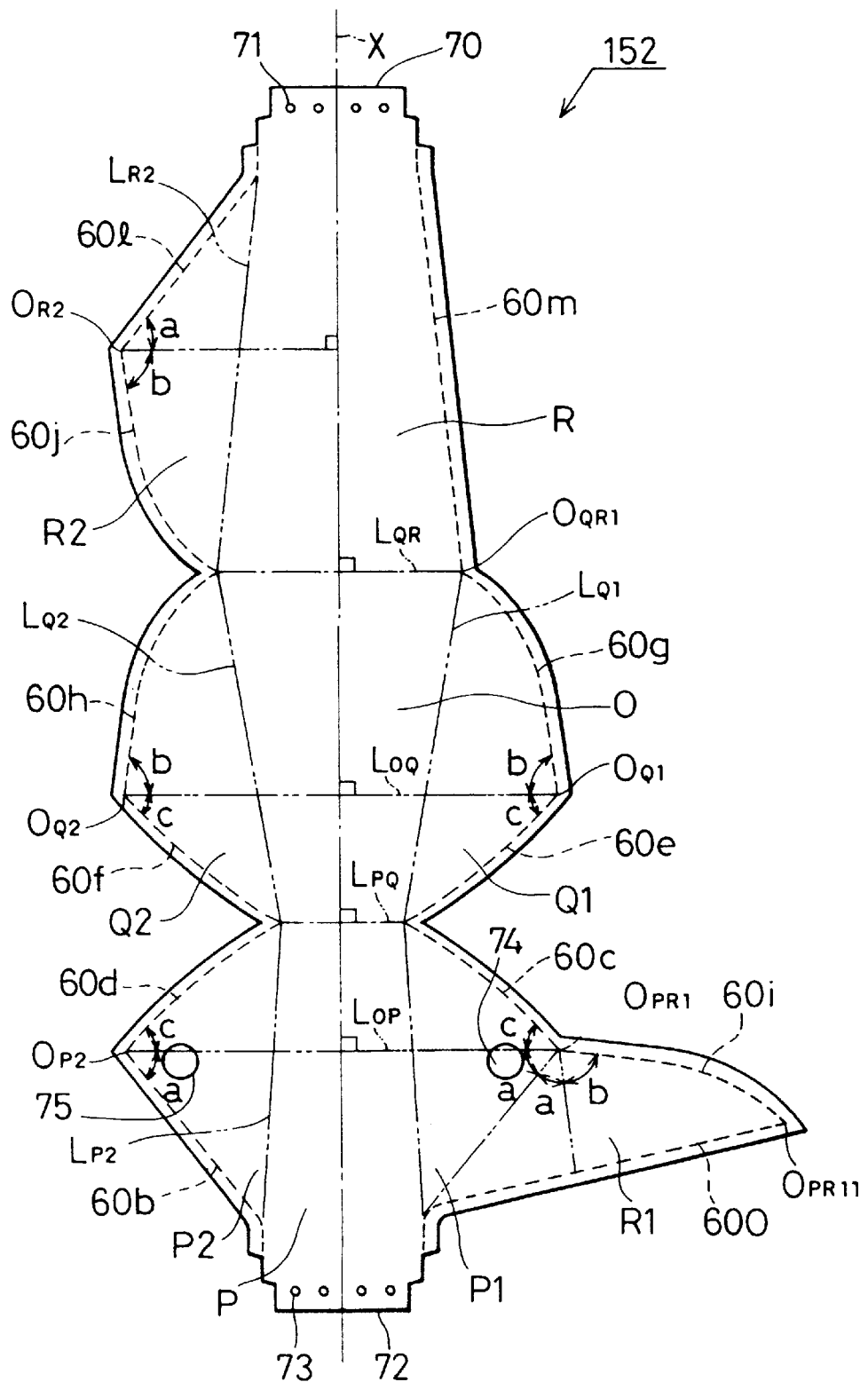
FIG. 34 is a plane view illustrating an air bag which includes a square section PR1 instead of the first triangular section R1 which is illustrated in FIG. 28.

It is possible to form the side portions asymmetrically to the axis X as illustrated in FIG. 34. As shown in FIG. 34, the left side of the air bag 152 is the same as the left of the air bag 150 illustrated in FIG. 28, and the right side of the air bag 152 is the same as the right of the air bag 151 illustrated in FIG. 33.

(Fourteenth Embodiment)

Figure 35:
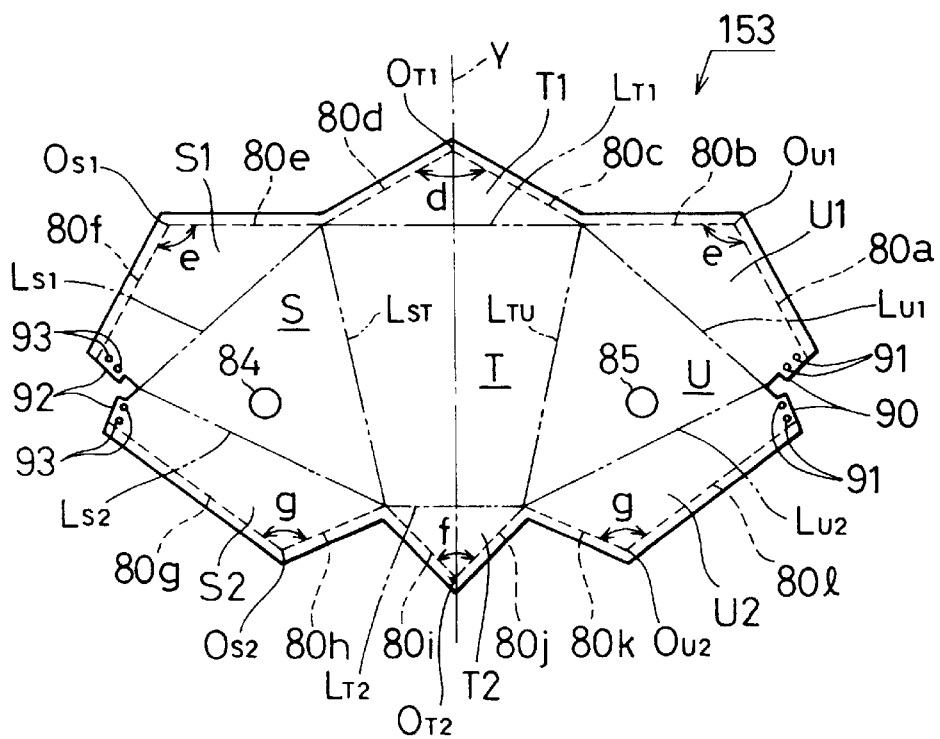
FIG. 35 is a plane view illustrating an air bag in a spread out state according to a fourteenth preferred embodiment of the present invention.

A fourteenth preferred embodiment of the present invention is illustrated in FIG. 35. In the thirteenth embodiment, the longitudinal direction of the belt portion is arranged vertically with respect to the passenger. On the other hand, this embodiment is characterized in that longitudinal direction of the belt portion is arranged laterally with respect to the passenger.

An air bag 153 is configured in a predetermined shape by means of cutting a cloth and includes a triangular first base section S, a trapezoidal second base section T and a triangular third base section U as belt portions, all of which are consecutively longitudinally formed. When the air bag 153 is inflated, the first base T is arranged in front of the passenger, and the second and third base sections S, U are arranged at both sides of the first base section T because the longitudinal direction of the air bag 153 is vertically formed. The air bag 153 includes an upper section S1 and a bottom section S2, both of which are disposed at respective sides of the first base section S; a upper section T1 and a bottom section T2, both of which are disposed at respective sides of the second base section T, and also includes an upper section U1 and a bottom section U2, both of which are disposed at respective sides of the third base section U. The upper section T1 and the bottom section T2 are triangular, and the upper sections S1, U1 and the bottom sections S2, U2 are almost quadrilateral. Each upper section and each bottom section is symmetrically formed with respect to an axis Y which is perpendicular to the longitudinal direction of the air bag 153. The base sections S, T have holes 84, 85 which are used for exhausting the gas after inflation of the air bag 153 to control the pressure of the gas inside of the air bag 153. With regard to the upper sections S1, T1 and U1, a top portion $O_{S1}$ of the base section S1 is attached to a top portion $O_{T1}$ of the base section T1 and a top portion $O_{U1}$ of the base section U1, and a line 80$a$ is sewn up a line 80$f$, a line 80$b$ is sewn up a line 80$c$, and a line 80$d$ is sewn up a line 80$e$. Also, with regard to the bottom sections S2, T2 and U2, a top portion $O_{S2}$ of the base section S2 is attached to a top portion $O_{T2}$ of the base section T2 and a top portion OU2 of the base section U2, and a line 80$g$ is sewn up a line 80$l$, a line 80$h$ is sewn up a line 80$i$, and a line 80$j$ is sewn up a line 80$k$. As shown in FIG. 35, lines 80$a$–80$l$ are straight. The base sections S1, S2 have an opening section 92 which has plurality of holes 93 for fixing the air bag 153 to the air bag device (not shown), and the base sections U1, U2 have an opening section 40 which has plurality of holes 41 for fixing the air bag 153 to the air bag device. The gas flows into inside of the air bag 153 via the opening portions 40, 42.

In the upper sections S1, T1 and U1, the total of three angles at the top points $O_{S1}$, $O_{T1}$, $O_{U1}$ of the upper sections S1, T1, U1, that is angle (d+2×e), is set between 330 degrees and 360 degrees; also, in the upper sections S2, T2 and U2, the total of three angles at the top points $O_{S2}$, $O_{T2}$, $O_{U2}$ of the upper sections S2, T2, U2, that is, angle (f+2×g), is set between 330 degrees and 360 degrees. When the air bag 153 is inflated, base sections S2, T2 and U2 of the air bag 153 are expanded. However, in this embodiment, because the total of angles at the top points is set between 330 degrees and 360 degrees, when the air bag 153 is inflated, sewn portions of the air bag 153 can be kept smooth without being wrinkled.

As described above, when the longitudinal direction of the belt portion is laterally arranged with respect to the passenger, the air bag 153 in this embodiment gets the same effects as the air bag 150 described in the thirteenth embodiment.

(Fifteenth Embodiment)

Figure 36:
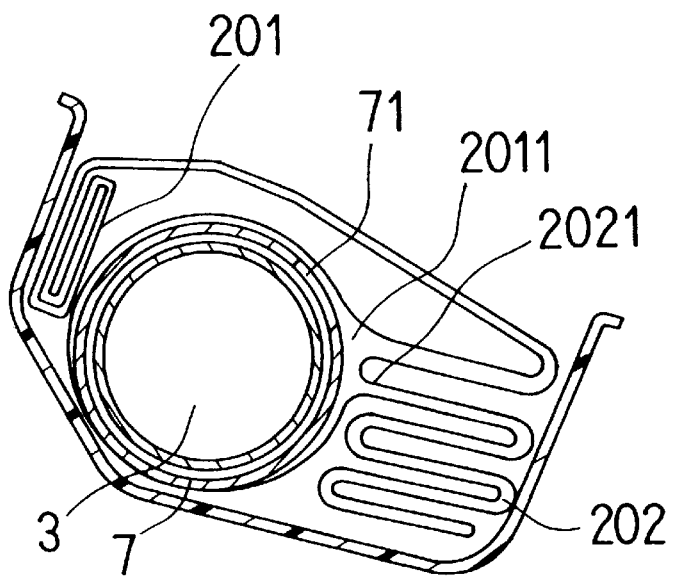
FIG. 36 is a cross-sectional view illustrating an air bag device for vehicles according to a fifteenth preferred embodiment of the present invention.

A Fifteenth preferred embodiment of the present invention is described based on FIG. 36, which shows a longitudinal cross-sectional view illustrating an air bag device (not inflated) for vehicles. The air bag device described in this embodiment has almost the same structure as the air bag described in the tenth preferred embodiment except for the way of folding the upper folding portion 201. As shown in FIG. 36, this embodiment is characterized in that the upper folding portion 201 is folded opposite the lower folding portion 202, and the container can 7 is disposed between the upper folding portion 201 and the lower folding portion 202.

(Sixteenth Embodiment)

Figure 37:
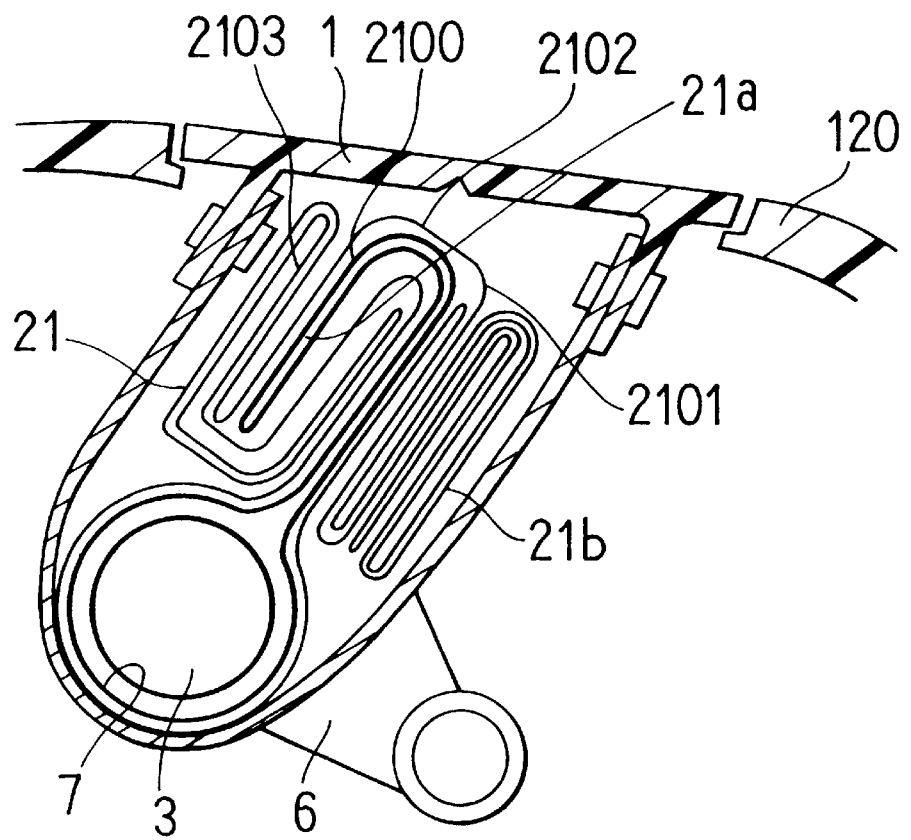
FIG. 37 is a cross-sectional view illustrating an air bag device for vehicles according to a sixteenth preferred embodiment of the present invention.

A sixeenth preferred embodiment of the present invention is described based on FIG. 37, which shows a longitudinal cross-sectional view illustrating an air bag device (not inflated) for vehicles. The air bag device described in this embodiment has almost the same structure as the air bag described in the eleventh preferred embodiment except for the way of folding the air bag 2. As shown in FIG. 37, this embodiment is characterized in that the air bag is laterally folded.

The present invention may be embodied in still other ways without departing from the spirit or essential character thereof. For instance, the belt portion includes the quadrilateral base sections P, Q and R which are consecutively formed in the longitudinal direction in the thirteenth embodiment, and the belt portion includes the quadrilateral base section T and the triangular base sections S and U which are consecutively formed in the longitudinal direction in the fourteenth embodiment; however, it is possible to form a belt portion using single quadrilateral or differently-shaped cloth only if the cloth is belt-shaped.

In the thirteenth embodiment, the air bag 150 is configured in the predetermined shape by cutting a single piece of cloth; however, an air bag made from multiple sections of cloth sewn together may be used instead.

In the thirteenth embodiment, lines 60$a$, 60$b$, 60$k$ and 60$l$ are straight, and the lines 60$c$, 60$d$, 60$e$, 60$f$, 60$g$, 60$h$, 60$i$ and 60$j$ are outwardly convex; in the fourteenth embodiment, lines 30$a$–30$l$ are straight; however, it is possible for all lines to be outwardly convex.

In the thirteenth embodiment, the angle surrounded by the line 60$a$ and the vertical line $L_{OP}$, the angle surrounded by the line 60$b$ and the vertical line $L_{OP}$, the angle surrounded by the line 60$k$ and the vertical line $L_{OR}$, and the angle surrounded by the line 60$l$ and the vertical line $L_{OR}$ are controlled so that the total of the angles at the top points can be set between 330 degrees and 360 degrees; however, it is possible to control other angles at the top points so that the total of the angles at the top points can be set between 330 degrees and 360 degrees.

Such changes and modifications are to be understood as being included within the scope of the present invention as defined by the appended claims.

What is claimed is:

1. An air bag device for vehicles, the device comprising:
a case disposed in a vehicle;
a gas generator, in the case, for generating gas upon collision of the vehicle, the gas generator having an opening for allowing the gas to flow; and
an air bag folded in the case, the air bag including:
a contact face including an upper portion and a lower portion,
wherein the lower portion is disposed at a position adjacent to a side of the gas generator and the upper portion is disposed at one of a position adjacent to a top of the gas generator and a position adjacent to a side of the gas generator opposite to the side adjacent to the lower portion, such that a boundary between the upper and lower portions is close to the gas generator opening, and
inflation control means for receiving the gas directly through the opening from the gas generator to near the boundary of the upper and lower portions and for controlling inflation of the upper and lower portions of the contact face to inflate the upper portion of the contact face earlier than the lower portion of the contact face when the gas is received from the gas generator.

2. An air bag device according to claim 1, wherein the upper portion includes an upper side and a lower side, and the inflation control means is further for inflating the lower side of the upper portion earlier than the upper side of the upper portion of the contact face and the lower portion of the contact face when the gas is received from the gas generetor.

3. An air bag device according to claim 1, wherein the inflation control means is further for inflating the upper portion of the contact face upward toward the back of the vehicle along the inside of a windshield when the gas is received from the gas generator.

4. An air bag device according to claim 1, wherein each of the upper and lower portions is separately folded up, the folded number of the upper portion being less than that of the lower portion.

5. An air bag device according to claim 4, wherein the lower portion is folded in a direction away from the boundary with the upper portion.

6. An air bag device for vehicles, the device comprising:
a case disposed in a vehicle, the case including an opening;
a gas generator, in the case, for generating gas upon collision of the vehicle;
a main bag, folded in the case, including
a first portion located next to the opening of the case, and
a second portion located at a portion of the case opposite the opening of the case, for receiving the gas from the first portion; and
an inner bag folded in the first portion of the main bag, for receiving the gas from the gas generator, the inner bag including holes for providing the gas to the first portion of the main bag;
wherein the first portion of the main bag is inflated upon being provided with the gas from the inner bag, and the second portion of the main bag is inflated later than the first portion of the main bag upon being provided with the gas from the first portion of the main bag.

7. An air bag device according to claim 6, wherein the first portion corresponds to an upper portion of the inflated air bag, and the second portion corresponds to an lower portion of the inflated air bag.

8. An air bag device according to claim 6, wherein one of the first and the second portions of the main bag is interposed between the other of the first and the second portions of the main bag and the gas generator when the main bag is folded.

9. An air bag device according to claim 6, wherein the first portion of the main bag and the second portion of the main bag are separately folded in the case.

10. An air bag device according to claim 6, wherein the first portion of the main bag is disposed upward toward the back of the case and the second portion of the main bag disposed downward toward the back of the case.

11. An air bag device according to claim 6, wherein the second portion of the main bag extends from an edge of the first portion of the folded main bag, and is disposed under the first portion of the main bag in the case.

12. A method of folding an air bag including a main bag and an inner bag contained in the main bag, the method comprising:
spreading out one half side of the main bag in one direction;
spreading out the other half side of the main bag in another direction;
placing the inner bag in one half side of the main bag;
folding a right side and a left side of the one half side of the main bag and the right side and the left side of the other half side of the main bag toward a center side of the main bag so that total of lateral widths, which includes a lateral width of the first portion and a lateral width of the second portion, is approximately the same as a lateral width of the case; and
further separately folding the first portion and the second portion to have a predetermined shape.

13. An air bag device for vehicles, the device comprising:
a case disposed in a vehicle;
a gas generator, in the case, for generating gas upon collision of the vehicle; and
an air bag folded in the case, the air bag including:
a contact face including an upper portion and a lower portion, and
inflation control means for receiving the gas from the gas generator and for controlling inflation of the upper and lower portions of the contact face to inflate the upper portion of the contact face earlier than the lower portion of the contact face when the gas is received from the gas generator,
wherein the air bag includes:
a belt portion, and
side portions which are formed at both longitudinal sides of the belt portion and have plural polygon-shaped sections which are consecutively formed along the belt portion; and
a total of angles at top points of the plural polygon-shaped sections away from the belt portion is less than 360 degrees.

14. An air bag device according to claim 13, wherein the total of angles at top points of the plural polygon-shaped sections is between 330 degrees and 360 degrees.

15. An air bag device according to claim 13, wherein the total of angles at top points of the plural polygon-shaped sections is between 345 degrees and 355 degrees.

16. An air bag device according to claim 13, wherein one side of one of the sections which has one of the top points as one edge thereof is sewn with another side of another one of the sections so that the top points are adjusted after the air bag is folded.

17. An air bag device according to claim 16, wherein each polygon-shaped section has a substantially triangle shape.

18. An air bag device according to claim 17, wherein the total of angles at top points of the plural polygon-shaped sections are set to be less than 360 degrees by changing an outer angle which is made by dividing the one of the top angles into two angles by a vertical line extending from the top portions to a longitudinal axis of the belt portion.

19. An air bag device according to claim 13, wherein the belt portion is made of plural quadrangle cloth sections consecutively to each other in a longitudinal direction.

20. An air bag device according to claim 16, wherein at least one side of the sections is outwardly convex.

21. An air bag device according to claim 16, wherein:
the air bag includes an opening for allowing gas to flow thereinto; and
one side of the sections next to the opening is straight, and other sides of the sections are outwardly convex.

\* \* \* \* \*